United States Patent
Tamura et al.

(10) Patent No.: US 8,124,233 B2
(45) Date of Patent: Feb. 28, 2012

(54) ANTI-REFLECTION FILM, AND POLARIZING PLATE AND IMAGE DISPLAY DEVICE USING THE SAME

(75) Inventors: Akio Tamura, Minami-Ashigara (JP);
Masaki Noro, Minami-Ashigara (JP);
Masato Nagura, Minami-Ashigara (JP)

(73) Assignee: Fujifilm Corporation, Tokyo (JP)

( * ) Notice: Subject to any disclaimer, the term of this patent is extended or adjusted under 35 U.S.C. 154(b) by 1095 days.

(21) Appl. No.: 11/994,155

(22) PCT Filed: Oct. 12, 2006

(86) PCT No.: PCT/JP2006/320799
§ 371 (c)(1),
(2), (4) Date: Dec. 28, 2007

(87) PCT Pub. No.: WO2007/043700
PCT Pub. Date: Apr. 19, 2007

(65) Prior Publication Data
US 2009/0122410 A1     May 14, 2009

(30) Foreign Application Priority Data
Oct. 14, 2005 (JP) ............................. P2005-300332

(51) Int. Cl.
*B32B 27/26* (2006.01)
*B32B 27/28* (2006.01)

(52) U.S. Cl. .................. 428/421; 428/422; 428/447
(58) Field of Classification Search .................. None
See application file for complete search history.

(56) References Cited

U.S. PATENT DOCUMENTS
2003/0232155 A1   12/2003   Obayashi et al.
(Continued)

FOREIGN PATENT DOCUMENTS
JP            57-34107 A        2/1982
(Continued)

*Primary Examiner* — Ramsey Zacharia
(74) *Attorney, Agent, or Firm* — Birch, Stewart, Kolasch & Birch, LLP

(57) ABSTRACT

An anti-reflection film, which comprises: a low refractive index layer that is formed by curing a coating solution composition comprising: a fluorine-free copolymer containing a constituent having a polysiloxane structure represented by formula (1) as defined in the specification in a main chain and a constituent containing a hydroxyl group in a side chain; and a fluorine-containing copolymer; a polarizing plate wherein the anti-reflection film is used as one of two protective films for a polarizing film; and an image display device wherein the anti-reflection film or the polarizing plate is used in the outermost surface of the display.

8 Claims, 1 Drawing Sheet

U.S. PATENT DOCUMENTS

2004/0151918 A9 * 8/2004 Mitsuishi et al. ............. 428/447

FOREIGN PATENT DOCUMENTS

| | | |
|---|---|---|
| JP | 61-275311 A | 12/1986 |
| JP | 8-92323 A | 4/1996 |
| JP | 11-189621 A | 7/1999 |
| JP | 11-228631 A | 8/1999 |
| JP | 2000-17028 A | 1/2000 |
| JP | 2000-313709 A | 11/2000 |
| JP | 2003-202407 A | 7/2003 |
| JP | 2003-329804 A | 11/2003 |
| JP | 2004-69983 A | 3/2004 |

* cited by examiner

ANTI-REFLECTION FILM, AND POLARIZING PLATE AND IMAGE DISPLAY DEVICE USING THE SAME

TECHNICAL FIELD

The present invention relates to an anti-reflection film, a polarizing plate using the anti-reflection film, and an image display device using the polarizing plate over the outermost surface.

BACKGROUND ART

In an image display device such as a cathode ray tube display device (CRT), a plasma display device (PDP), an electroluminescence display (ELD) or a liquid crystal display device (LCD), an anti-reflection film is generally disposed over the outermost surface of the display device so as to reduce reflectance based on the principle of optical interference for the purpose of preventing reduction of contrast due to reflection of external light or reflection of undesired images in its screen.

Such anti-reflection film can generally be prepared by forming a low refractive index layer having an appropriate thickness on a support or on a high refractive index layer formed thereon. In view of anti-reflection performance, a material having a refractive index as low as possible is desired as the material for the low refractive index layer and, at the same time, the material is required to have high stain-proof properties and high scratching resistance since the anti-reflection film is used over the outermost surface of the display. In order to obtain high scratching resistance with respect to a thin film of about 100 nm in thickness, it is of importance to enhance strength of the film itself.

As a polymer for forming the low refractive index layer, it is well known to cure a fluorine-containing polymer having a low refractive index and use the cured polymer. Also, regarding the curing method, there have been known various methods. For example, it has been commonly conducted to cure a polymer having hydroxyl group with various curing agents (JP-A-57-34107, JP-A-61-275311 and JP-A-8-92323). However, such conventional polymers are still insufficient with respect to film hardness, and have been required to be improved.

As a means to reduce the refractive index of a material, there is a method (2) of reducing the density of the material (introducing voids into the material) in addition to the method (1) of introducing fluorine atom into the material. However, both methods involve the problem that film strength is impaired and scratching resistance is reduced.

As a method of markedly improving stain-proof properties and scratching resistance while keeping the refractive index at a low level, it is effective to impart slipping properties to the surface. With respect to imparting slipping properties to the surface, techniques of introducing fluorine and introducing silicon are effective. In particular, addition of a small amount of a silicone series compound to a low refractive index material provides markedly improved surface slipping properties, markedly improved stain-proof properties and markedly improved scratching resistance. On the other hand, however, there have been involved various problems such as poor compatibility with materials in a low refractive index layer, bleed-out with the elapse of time or under the condition of high temperature, transfer of the silicone component to a medium in contact therewith, and deterioration of performance and stain of the production line due to these phenomena.

Particularly with an anti-reflection film, generation of haze due to the insufficient compatibility deteriorates optical performance, thus being a serious problem. Also, upon winding up a film after coating thereon the low refractive index layer, the silicone series compound can adhere to the back side of the film, which causes troubles in the successive processing steps, thus such adhesion having been a serious problem. That is, there has been required a technique of effectively precipitating only a siloxane moiety of the compound on the surface and allowing the remaining moiety of the compound bound to silicon atom to effectively anchor into the film of the low refractive index layer.

Regarding this problem, there have been proposed techniques (JP-A-11-189621, JP-A-11-228631, JP-A-2000-17028 and JP-A-2000-313709) of fluorine-containing olefin copolymers into which a polysiloxane block copolymer component is introduced using a silicone series macroazo initiator and applying the copolymer to the use of an anti-reflection film.

DISCLOSURE OF THE INVENTION

Uniformity and durability of the film are markedly improved by these techniques but, for controlling the surface slipping properties of the material as one likes, it has been necessary to cope with in the production step of the fluorine-containing olefin copolymer, for example, to increase the amount of the silicone series macroazo initiator, thus the techniques being complicated. Therefore, it has been required to develop a technique which enables one to properly control surface slipping properties to thereby impart desired surface slipping properties to the existing fluorine-containing olefin copolymers.

With the above-described background, there has been required a technique which enables one to control the amount of a silicone component as one likes without spoiling uniformity of the film of the low refractive index layer.

A first object of the invention is to provide a coating type anti-reflection film suited for mass production.

A second object of the invention is to provide an anti-reflection film having a low reflectance and having excellent stain-proof properties and scratching resistance.

A third object of the invention is to provide a polarizing plate using the anti-reflection film as a protective film for a polarizing film.

A fourth object of the invention is to provide an image display device having excellent stain-proof properties and scratching resistance of the surface imparted by using the anti-reflection film over the outermost surface or using the polarizing plate.

The objects of the present inventor has been attained by the invention of the [1] to [7] described below.

[1] An anti-reflection film, which comprises:

a low refractive index layer that is formed by curing a coating solution composition comprising: a fluorine-free copolymer containing a constituent having a polysiloxane structure represented by formula (1) in a main chain and a constituent containing a hydroxyl group in a side chain; and a fluorine-containing copolymer:

Formula (1)

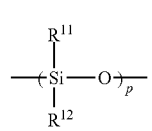

wherein $R^{11}$ and $R^{12}$ each independently represents a hydrogen atom, an alkyl group or an aryl group; and p represents an integer of from 10 to 500.

[2] The anti-reflection film as described in [1] above, wherein the fluorine-free copolymer is represented by formula (2):

Formula (2)

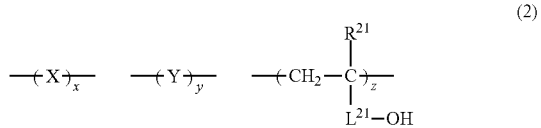

wherein X represents a unit containing the polysiloxane structure represented by formula (1);

Y represents a polymer unit based on any vinyl monomer which may be constituted by a single component or may be constituted by plural components;

$R^{21}$ represents a hydrogen atom or a methyl group;

$L^{21}$ represents a single bond or a divalent linking group;

x to z each represents a mol fraction (%) of each constituent, with x to z satisfying $10 \leqq x < 100$, $0 \leqq y \leqq 50$, $0 < z \leqq 50$, and $0 < y+z \leqq 90$.

[3] The anti-reflection film as described in [1] or [2] above, wherein the fluorine-containing copolymer is represented by formula (3):

Formula (3)

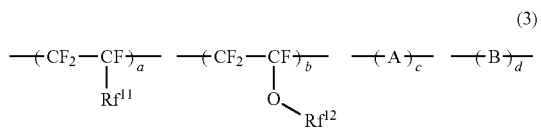

wherein $Rf^{11}$ represents a perfluoroalkyl group containing from 1 to 5 carbon atoms;

$Rf^{12}$ represents a fluorine-containing alkyl group containing from 1 to 30 carbon atoms, having a straight, branched or alicyclic structure and optionally having an ether bond;

B represents a polymer unit based on a hydroxyl group-containing monomer;

A represents a polymer unit based on any vinyl monomer which may be constituted by a single component or plural components; and a to d each represents a mol fraction (%) of each constituent, with a to d satisfying $30 \leqq a+b \leqq 90$, $5 \leqq a \leqq 90$, $0 \leqq b \leqq 70$, $0 \leqq c \leqq 50$, and $10 \leqq d$.

[4] The anti-reflection film as described in any of [1] to [3] above, wherein the coating solution composition for forming the low refractive index layer further comprises a cross-linking agent capable of reacting with a hydroxyl group.

[5] The anti-reflection film as described in [4] above, wherein the cross-linking agent is a compound that has two or more carbon atoms, each of which is substituted with an alkoxy group and adjacent to a nitrogen atom, per molecule.

[6] A polarizing plate, which comprises:

a polarizing film; and at least two protective films, wherein an anti-reflection film as described in any of [1] to [5] above is used as one of the at least two protective films.

[7] An image display device in which an anti-reflection film as described in any of [1] to [5] above or a polarizing plate as described in [6] above is used in the outermost surface of the display.

BRIEF DESCRIPTION OF THE DRAWING

FIGS. 1A and 1B are cross-sectional schematic views showing the layer structure of the anti-reflection film composed of plurality of layers, wherein FIG. 1A shows an example of a 4-layer structure, and FIG. 1B shows an example of a 5-layered structure, wherein 1a denotes an anti-reflection film; 1b denotes an anti-reflection film; 2 denotes a transparent support; 3 denotes a hard coat layer; 4 denotes a high refractive index layer; 5 denotes a low refractive index layer (outermost layer); and 6 denotes a middle refractive index layer

BEST MODE FOR CARRYING OUT THE INVENTION

Anti-reflection Film

The anti-reflection film of the invention has a low refractive index layer formed by curing a composition containing a fluorine-free copolymer containing both a constituent having a polysiloxane structure represented by the formula (1) and a constituent containing a hydroxyl group in the side chain and a fluorine-containing copolymer. The anti-reflection film may be of a single layer structure comprising only the low refractive index layer as an anti-reflective layer or may have a multi-layer structure wherein a middle refractive index layer, a high refractive index layer, a low refractive index layer and a hard coat layer are laminated one over the other. An embodiment of the multi-layer structure is preferred, with an embodiment wherein three or more layers of a middle refractive index layer, a high refractive index layer and a low refractive index layer are laminated being particularly preferred. It is preferred to previously form an anti-reflective layer on a transparent support to prepared an anti-reflection film and dispose it on an image display device.

[Typical Layer Structure of the Anti-reflection Film]

The fundamental structure of the anti-reflection film which is a preferred embodiment of the invention will be described below by reference to drawings.

Figure 1A:
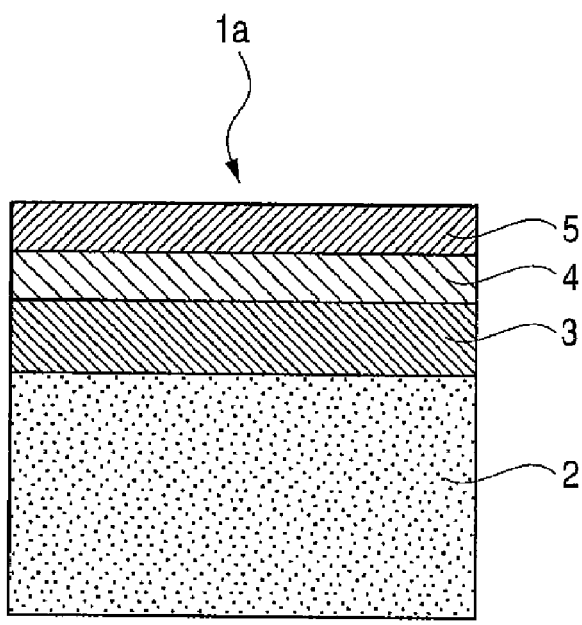

The schematic sectional view shown by FIG. 1A illustrates one example of the anti-reflection film of the invention. The anti-reflection film 1a has a layer structure wherein a transparent support 2, a hard coat layer 3, a high refractive index layer 4 and a low refractive index layer 5 are arranged in this order. The refractive index of the high refractive index layer 4 is in the range of preferably from 1.50 to 2.00, and the refractive index of the low refractive index layer 5 is in the range of preferably from 1.30 to 1.44.

In the invention, the hard coat layer may be provided as a layer different from the high refractive index layer or as a high-refractive-index hard coat layer that exerts the function of the high refractive index layer as well. Also, the hard coat layer may be a single layer or may be constituted by plural layers, e.g., 2 to 4 layers. Further, the hard coat layer may be omitted. Therefore, the hard coat layer shown in FIG. 1 is not necessary. However, in order to impart sufficient film strength, it is preferred to provide at least one of the hard coat layers by coating. The low refractive index layer is provided as the outermost layer by coating.

Figure 1B:
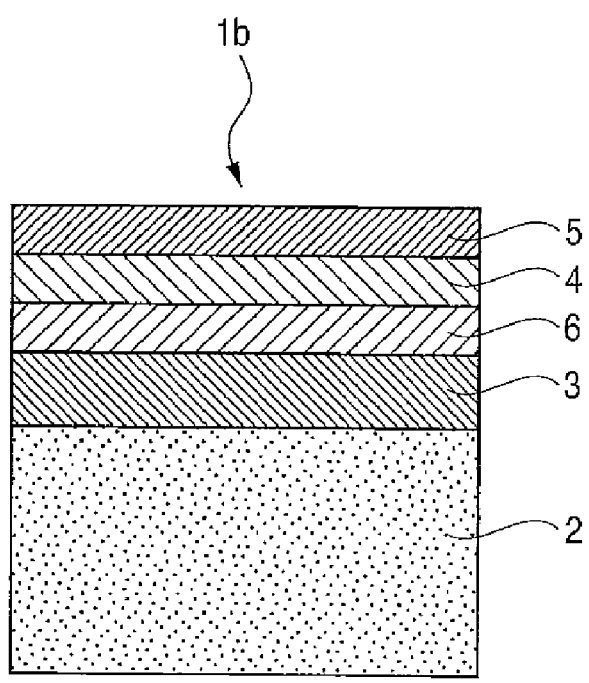

The schematic sectional view shown by FIG. 1B illustrates another example of the anti-reflection film of the invention. The anti-reflection film 1b has a layer structure wherein a transparent support 2, a hard coat layer 3, a middle refractive index layer 6, a high refractive index layer 4 and a low refractive index layer (outermost layer) 5 are arranged in this order. The transparent support 2, the middle refractive index layer 6, the high refractive index layer 4 and the low refractive index layer 5 have the refractive indexes satisfying the following relations:

refractive index of the high refractive index layer>refractive index of the middle refractive index layer>refractive index of the transparent support>refractive index of the low refractive index layer.

With the layer structure shown in FIG. 1B, it is preferred that the middle refractive index layer satisfies the conditions shown by the following numerical formula (1), the high refractive index layer satisfies the conditions shown by the following numerical formula (2), and the low refractive index layer satisfies the conditions shown by the following numerical formula (3), respectively, as described in JP-A-59-50401:

$(h\lambda/4) \times 0.7 < n_1 d_1 < (h\lambda/4) \times 1.3$   numerical formula (1)

$(i\lambda/4) \times 0.7 < n_2 d_2 < (i\lambda/4) \times 1.3$   numerical formula (2)

$(j\lambda/4) \times 0.7 < n_3 d_3 < (j\lambda/4) \times 1.3$   numerical formula (3)

In the numerical formulae (1) to (3), h is a positive integer (generally, 1, 2 or 3), i is a positive integer (generally, 1, 2 or 3), and j is a positive odd number (generally 1) $n_1$, $n_2$ and $n_3$ are the refractive indexes of the middle refractive index layer, the high refractive index layer and the low refractive index layer, respectively, and $d_1$, $d_2$ and $d_3$ are the thickness values (nm) of the middle refractive index layer, the high refractive index layer and the low refractive index layer, respectively. λ represents a wavelength (nm) of visible light and is within the range of from 380 to 680 nm.

In the layer structure as shown in FIG. 1B, it is particularly preferred that the middle refractive index layer satisfies the following numerical formula (1-1), the high refractive index layer satisfies the following numerical formula (2-1), and the low refractive index layer satisfies the following numerical formula (3-1), respectively. Here, λ is 500 nm, h is 1, i is 2, and j is 1.

$(h\lambda/4) \times 0.80 < n_1 d_1 < (h\lambda/4) \times 1.00$   Numerical formula (1-1)

$(i\lambda/4) \times 0.75 < n_2 d_2 < (i\lambda/4) \times 0.95$   Numerical formula (2-1)

$(j\lambda/4) \times 0.95 < n_3 d_3 < (j\lambda/4) \times 1.05$.   Numerical formula (3-1)

Additionally, the terms "high refractive index", "middle refractive index" and "low refractive index" described herein mean relative magnitude of the refractive indexes among layers. Also, in FIG. 1B, the high refractive index layer is used as a light interference layer, which serves to provide an anti-reflection film having an extremely excellent anti-reflection performance.

[Low Refractive Index Layer]

Next, the low refractive index layer in the anti-reflection film of the invention will be described below.

The refractive index of the low refractive index layer in the invention is in the range of from 1.20 to 1.49, preferably from 1.30 to 1.44.

Further, in view of reducing reflectance, it is preferred for the low refractive index layer to satisfy the numerical formula (3):

$(j\lambda/4) \times 0.7 < n_3 d_3 < (j\lambda/4) \times 1.3$.   numerical formula (3)

In the numerical formula (3), j, $n_3$, $d_3$ and λ are the same as described hereinbefore, and λ is a value in the range of from 380 to 680 mm.

Additionally, to satisfy the above numerical formula (3) means that there exist j (a positive odd number, usually 1) when λ is in the above-described range.

[Materials for the Low Refractive Index Layer]

{Fluorine-free copolymer containing both a constituent having a polysiloxane structure represented by the following formula (1) in the main chain and a constituent containing a hydroxyl group in the side chain: polysiloxane structure-containing copolymer (S)}

For the purpose of improving scratching resistance by imparting surface slipping properties and of imparting stain-proof properties, the low refractive index layer in the anti-reflection film of the invention is formed by curing a composition containing a fluorine-free copolymer (S) containing both a constituent having a polysiloxane structure represented by the formula (1) in the main chain and a constituent containing a hydroxyl group in the side chain (hereinafter also referred to merely as "fluorine-free copolymer" or "polysiloxane structure-containing copolymer (S) together with a fluorine-containing copolymer. This polysiloxane structure-containing copolymer (S) enables one to freely control the amount of the introduced siloxane component by properly adjusting the amount of the copolymer. In addition, owing to the surface-localizing properties of siloxane and presence of hydroxyl group, it can effectively precipitate only the siloxane moiety on the surface while effectively anchoring in the film of the low refractive index layer.

Formula (1):

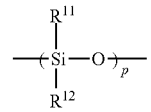

(1)

In the formula (1), $R^{11}$ and $R^{12}$ each represents a hydrogen atom, an alkyl group or an aryl group. The alkyl group preferably contains from 1 to 4 carbon atoms and is exemplified by a methyl group, a trifluoromethyl group and an ethyl group. The aryl group preferably contains from 6 to 20 carbon atoms and is exemplified by a phenyl group and a naphthyl group. Of these, a methyl group and a phenyl group are preferred, with a methyl group being particularly preferred. p represents an integer of from 10 to 500, preferably from 50 to 300, particularly preferably from 100 to 250.

As a process for synthesizing a copolymer containing a component (X) having the polysiloxane structure represented by the formula (1), there have conventionally been proposed several processes.

For example, J. C. Saam et al. reported in Macromolecules, vol. 3, p. 1 (1970) that a styrene-dimethylsiloxane block copolymer was obtrained by an anionic polymerization process (hereinafter this process being referred to as "anionic polymerization process").

Also, Ikusi Tezuka et al. reported in Makromol. Chem., Rapid Commun., vol. 5, p. 559 (1984) that a vinyl acetate-dimethylsiloxane block copolymer was obtained by a coupling reaction between prepolymers having a functional group (hereinafter this process being referred to as "prepolymer method").

Further, Hiroshi Inoue et al. reported in Kobunshi Gakkai Yokoshu, vol. 34, p. 293 (1984) that a methyl methacrylate-dimethylsiloxane block copolymer was obtained by radical polymerization of an azo group-containing polysiloxanamide having a radical polymerization-initiating ability (hereinafter this process being referred to as "high molecular initiator process").

However, with the anionic polymerization process and the prepolymer process, vinyl group-containing monomers adapted for the reaction are limited, and the reaction process involves many steps, or industrial utilization of the reaction can encounter difficulties with respect to reaction conditions. Industrial production of a block copolymer is possible by synthesis using a radical polymerization. Such synthesis can be applied to many vinyl type monomers and is preferred in that it involves fewer reaction steps.

From the above-described standpoint, the polysiloxane-containing copolymer (S) to be used in the invention is preferably produced by the high molecular initiator process. Such high molecular initiator is a polysiloxane compound having a group capable of generating a radical, such as an azo group or a peroxy group. Additionally, such initiators can be synthesized as described in, for example, JP-B-6-104711 and JP-A-6-93100.

(Preferred Examples of the High Molecular Initiator)

Of the high molecular initiators, preferred examples are shown below which, however, do not limit the invention in any way.

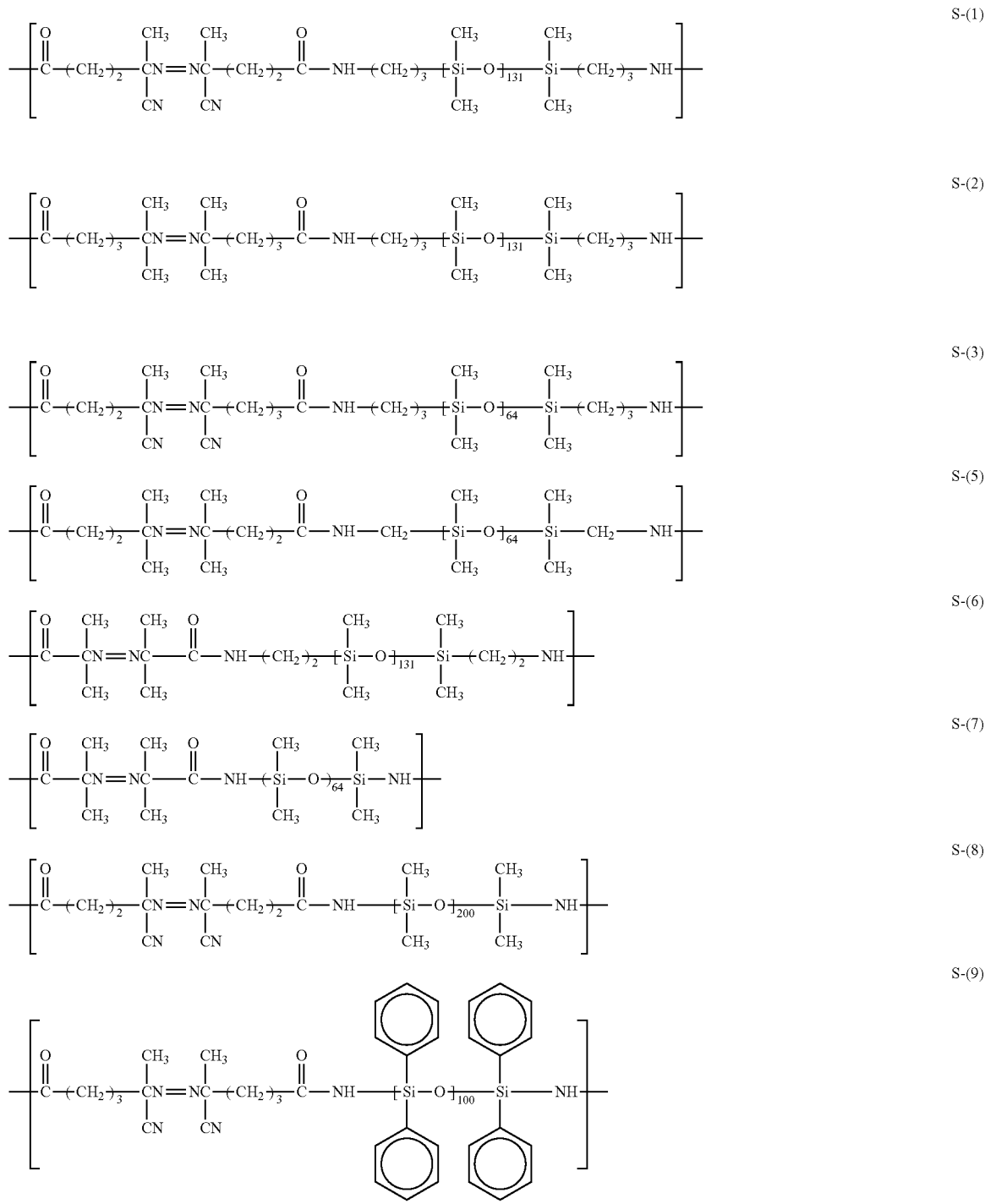

-continued
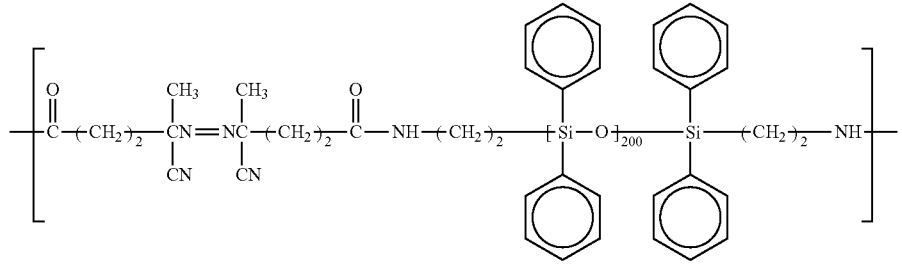
S-(10)
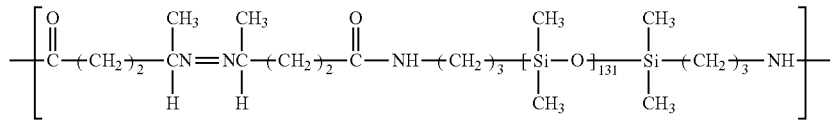
S-(11)
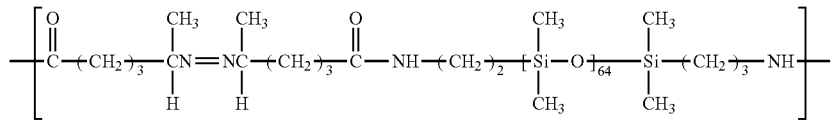
S-(12)
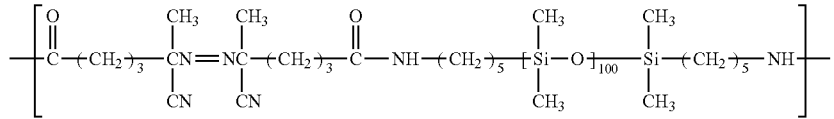
S-(14)
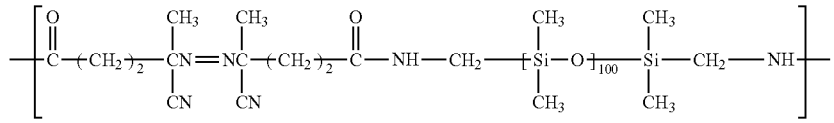
S-(15)
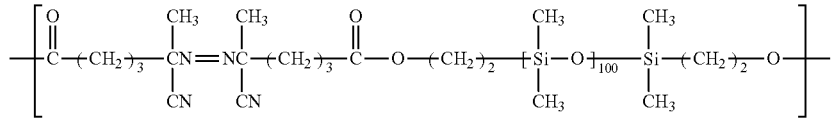
S-(16)
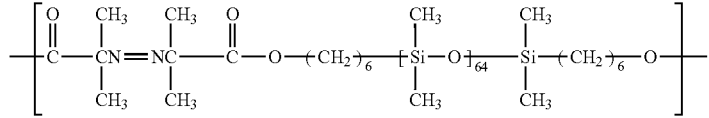
S-(18)
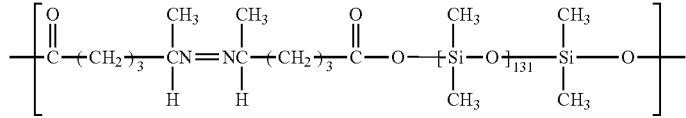
S-(19)
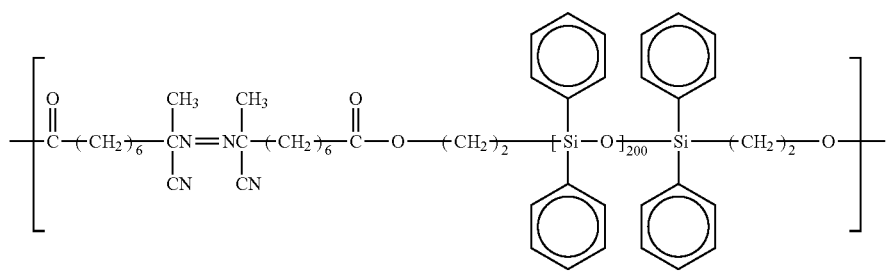
S-(21)

-continued
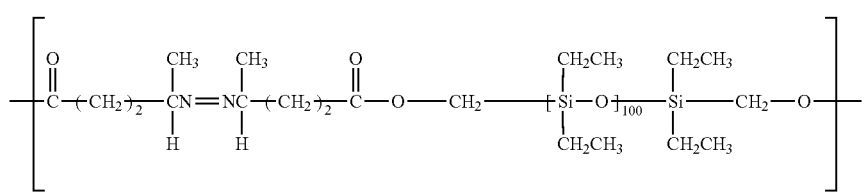
S-(22)
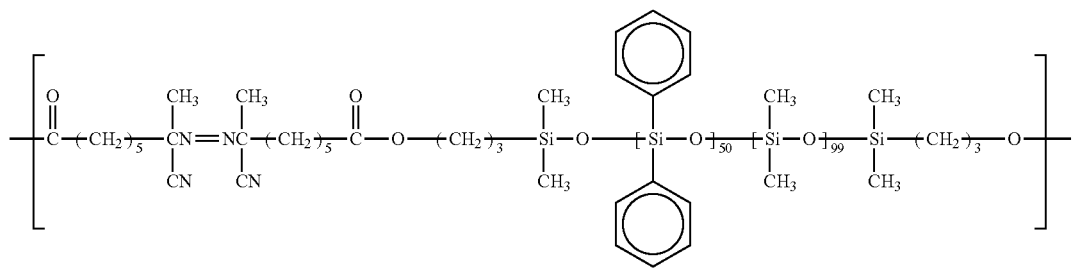
S-(24)
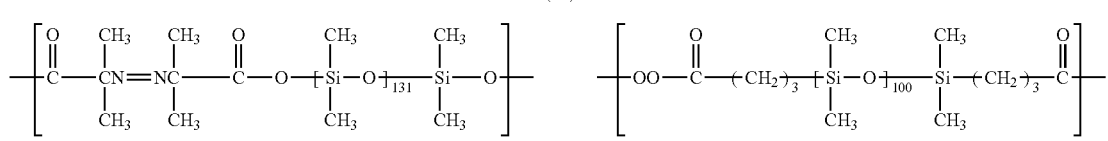
S-(25)
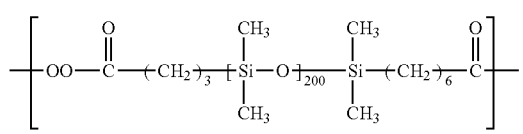
S-(26)
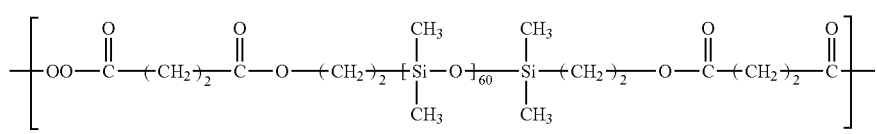
S-(27)
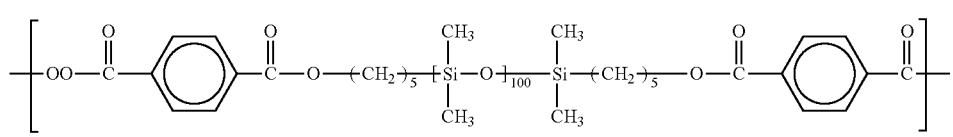
S-(28)
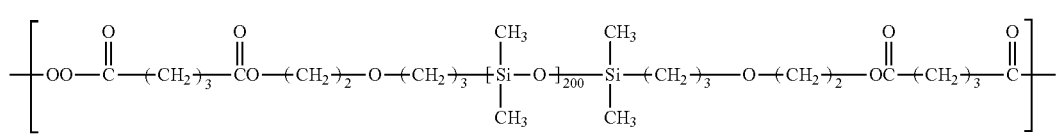
S-(29)
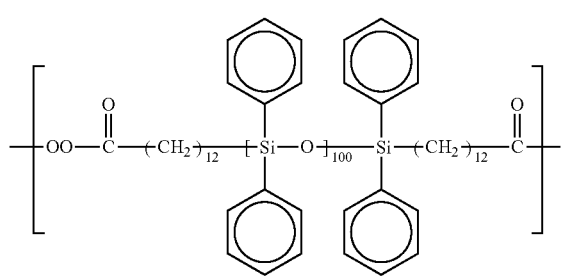
S-(30)
S-(31)
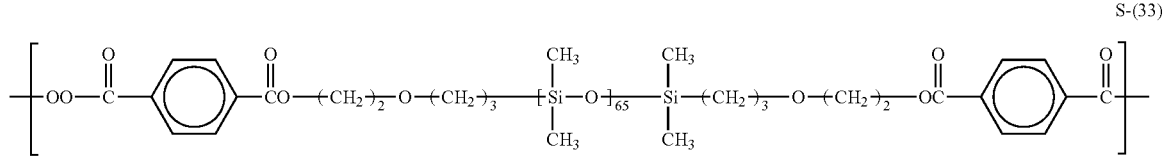
S-(33)

-continued

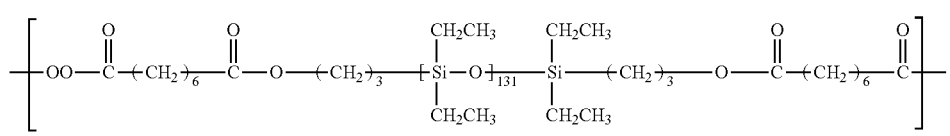
S-(34)

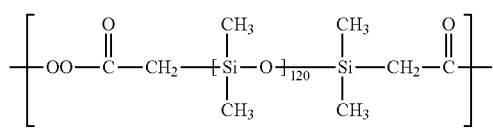
S-(35)

Also, the polysiloxane structure-containing copolymer (S) to be used in the invention necessarily contains a constituent (Z) containing a hydroxyl group in the side chain. Presence of the hydroxyl group permits cross-linking and prevents transfer. The polysiloxane structure-containing copolymer (S) preferably has a structure represented by the formula (2).

Formula (2):

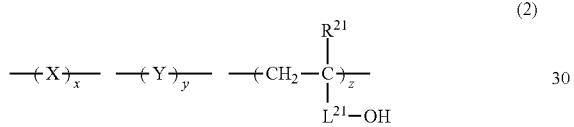
(2)

In the formula (2), X represents a unit containing the polysiloxane structure represented by the formula (1). Y represents a polymer unit based oil any vinyl monomer which may be constituted by a single component or may be constituted by plural components. $R^{21}$ represents a hydrogen atom or a methyl group, and $L^{21}$ represents a single bond or a divalent linking group. x to z each represents a mol fraction (%) of each constituent, with x to z satisfying $10 \leqq x < 100$, $0 \leqq y \leqq 50$, $0 < z \leqq 50$, and $0 < y+z \leqq 90$.

Hereinafter, the polymer unit represented by the following formula (4) in the copolymer (S) to be used in the invention will be described below.

Formula (4):

(4)

In the formula (4), $R^{21}$ represents a hydrogen atom or a methyl group. $L^{21}$ represents a single bond or a divalent linking group selected from among —O—, —CO—, —NH—, —CO—NH—, —COO—, —O—COO—, a substituted or unsubstituted alkylene group, an arylene group, a hetero ring group and a combination thereof, with a combination of —COO— and an alkylene group being preferred.

Preferred examples of the polymer unit represented by the above formula (4) will be shown below which, however, do not limit the invention in any way.

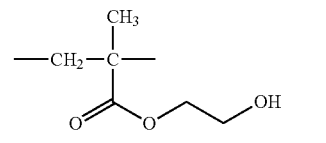
Z-1)

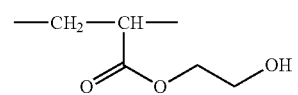
Z-2)

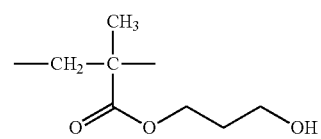
Z-3)

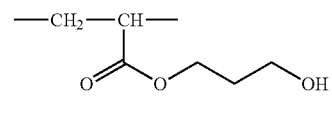
Z-4)

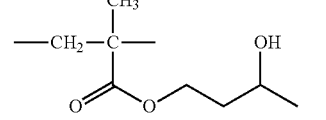
Z-5)

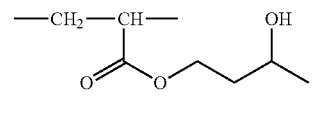
Z-6)

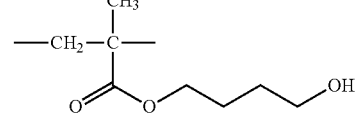
Z-7)

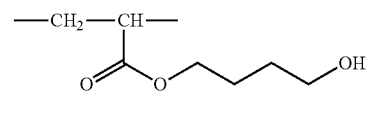
Z-8)

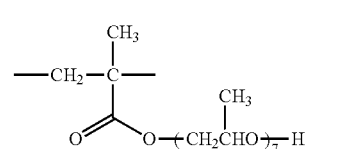
Z-9)

-continued

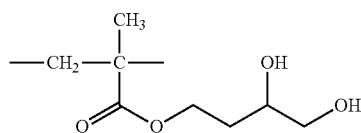
(Z-10)

The polysiloxane structure-containing copolymer (S) represented by the formula (2) to be used in the invention may contain other constituent (Y) in addition to the above-described components in view of adhesion to a substrate, solubility for a solvent, compatibility with other coating solution compositions and transparency. Examples of the monomers constituting such polymer unit include methyl acrylate, ethyl acrylate, n-butyl acrylate, isobutyl acrylate, cyclohexyl acrylate, methyl methacrylate, ethyl methacrylate, n-butyl methacrylate, isobutyl methacrylate, stearyl methacrylate, methyl vinyl ether, ethy vinyl ether, propyl vinyl ether, isobutyl vinyl ether, styrene, α-methylstyrene, acrylonitrile and methacrylonitrile.

From the above-described standpoint, the polysiloxane-containing copolymer (S) in the invention preferably contains the hydroxyl group-containing constituent (Z) represented by the foregoing formula (4) and an optional constituent (Y) in addition to the polysiloxane structure-containing constituent (X).

Mol fraction (%) of each constituent is so selected as to satisfy the relation of $10 \leq x < 100$, $0 \leq y \leq 50$, $0 < z \leq 50$, and $0 < y+z \leq 90$.

In the polysilocane-containing copolymer (S) in the invention, the constituent (X) is a necessary component for imparting a sufficient scratching resistance and imparting transparency and stain-proof properties to the resulting material, and x which represents the mol fraction (%) of (X) is preferably $50 \leq x < 100$, more preferably $85 \leq x < 100$.

In the copolymer (S), the constituent (Z) is a unit containing a hydroxyl group which is a cross-linking group for preventing transfer and, preferably, the introduction amount of (Z) is properly selected within the range of not reducing the content of (X) to a degree at which sufficient scratching resistance, stain-proof properties and transparency are difficult to obtain. Thus, a preferred range of the mol fraction of (Z) is $0 < z \leq 40$, more preferably $0 < z \leq 15$.

In the copolymer (S), the constituent (Y) other than (X) and (Y) may properly be introduced for imparting various properties such as adhesion to a substrate, solubility for a solvent, compatibility with other coating solution compositions and transparency. The introduction amount of (Y) is properly selected within the range of not reducing the content of (X) to a degree at which sufficient scratching resistance, stain-proof properties and transparency are difficult to obtain. Thus, a preferred range of the mol fraction of (Y) is $0 \leq y \leq 40$, more preferably $0 \leq y \leq 15$.

Specific examples of polymers useful in the invention are shown in Table 1. However, the invention is not limited only to them. Additionally, numbers in Table 1 respectively represent mol fractions of the polymerization units.

TABLE 1

| | X | Y | Z | x | y | z | Mw |
|---|---|---|---|---|---|---|---|
| P-1 | S-(1) | — | Z-1) | 90 | 0 | 10 | 38000 |
| P-2 | S-(1) | — | Z-2) | 90 | 0 | 10 | 28000 |
| P-3 | S-(1) | — | Z-9) | 90 | 0 | 10 | 44000 |
| P-4 | S-(1) | — | Z-10) | 90 | 0 | 10 | 52000 |

TABLE 1-continued

| | X | Y | Z | x | y | z | Mw |
|---|---|---|---|---|---|---|---|
| P-5 | S-(1) | MMA | Z-1) | 90 | 5 | 5 | 24000 |
| P-6 | S-(1) | MMA | Z-2) | 90 | 5 | 5 | 49000 |
| P-7 | S-(1) | t-BuMA | Z-9) | 90 | 5 | 5 | 32000 |
| P-8 | S-(1) | MMA | Z-10) | 90 | 5 | 5 | 33000 |
| P-9 | S-(2) | — | Z-1) | 90 | 0 | 10 | 61000 |
| P-10 | S-(2) | — | Z-2) | 90 | 0 | 10 | 26000 |
| P-11 | S-(2) | — | Z-9) | 90 | 0 | 10 | 35000 |
| P-12 | S-(2) | — | Z-10) | 90 | 0 | 10 | 26000 |
| P-13 | S-(2) | — | Z-1) | 80 | 0 | 20 | 34000 |
| P-14 | S-(2) | t-BuMA | Z-2) | 80 | 10 | 10 | 24000 |
| P-15 | S-(26) | — | Z-1) | 90 | 0 | 10 | 45000 |
| P-16 | S-(26) | — | Z-2) | 90 | 0 | 10 | 50000 |
| P-17 | S-(1) | — | Z-1) | 80 | 10 | 10 | 26000 |
| P-18 | S-(1) | — | Z-2) | 80 | 0 | 20 | 28000 |
| P-19 | S-(1) | — | Z-1) | 70 | 0 | 30 | 30000 |
| P-20 | S-(1) | — | Z-2) | 70 | 0 | 30 | 31000 |
| P-21 | S-(1) | MMA | Z-1) | 80 | 10 | 10 | 53000 |
| P-22 | S-(1) | — | Z-5) | 90 | 0 | 10 | 22000 |
| P-23 | S-(1) | — | Z-8) | 90 | 0 | 10 | 29000 |
| P-24 | S-(1) | — | Z-10) | 90 | 0 | 10 | 47000 |
| P-25 | S-(1) | — | Z-1) | 95 | 0 | 5 | 27000 |
| P-26 | S-(1) | — | Z-1) | 50 | 0 | 50 | 33000 |
| P-27 | S-(1) | — | Z-2) | 40 | 0 | 60 | 38000 |
| P-28 | S-(1) | MMA | Z-1) | 30 | 30 | 40 | 24000 |
| P-29 | S-(2) | — | Z-1) | 20 | 0 | 80 | 46000 |
| P-30 | S-(2) | MMA | Z-1) | 20 | 40 | 40 | 64000 |

Additionally, abbreviations in Table 1 represent the following.
t-BuMA: t-butyl methacrylate
MMA: methyl methacrylate (Synthesis of the Polysiloxane Structure-containing Copolymer (S))

Synthesis of the polysiloxane-containing copolymer (S) to be used in the invention can be conducted according to various polymerization processes such as a solution polymerization process, a precipitation polymerization process, a suspension polymerization process, a mass polymerization process and an emulsion polymerization process. In such processes, the synthesizing operation may be conducted in a known manner such as a batch-wise manner, a semi-continuous manner or a continuous manner.

As a method for initiating the polymerization, there are illustrated a method of using a radical initiator and a method of irradiating with light or radiation. These polymerization processes and the methods for initiating polymerization are described in, for example, Teiji Tsuruta, Kobunshi Gosei Hoho, revised edition (published by Nikkan Kogyo Shinbunsha in 1971) and Takayuki Otsu & Masayoshi Kinosita, Kobunsi Gosei No Jikkenho, published by Kagaku Dojin, 1972, pp. 124-154.

Of the above-described polymerization processes, the solution polymerization process using a radical initiator is preferred. As to a solvent to be used for the solution polymerization process, various organic solvents such as ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol and 1-butanol can be used independently, in combination of two or more thereof, or as a mixture with water.

The polymerization temperature is required to be determined depending on the desired molecular mass of the polymer to be produced and the kind of the initiator to be used. The polymerization can be carried out at a temperature ranging from 0° C. or lower to 100° C. or higher, but is preferably carried out in the range of from 50 to 120° C.

In introducing the polysiloxane moiety by using the high molecular initiator, other radical initiator may be used, as needed, together with the high molecular initiator.

Examples of the radical initiator to be used include diacyl peroxides such as acetyl peroxide and benzoyl peroxide; ketone peroxides such as methyl ethyl ketone peroxide and cyclohexanone peroxide; hydroperoxides such as hydrogen peroxide, t-butylhydroperoxide and cumene hydroperoxide; dialkyl peroxides such as di-t-butyl peroxide, dicumyl peroxide and dilauroyl peroxide; peroxy esters such as t-butyl peroxyacetate and t-butyl peroxypivalate; azo compounds such as azobisisobutyronitrile and azobisisovaleronitrile; and persulfates such as ammonium perxulfate, sodium persulfate and potassium persulfate.

Also, the radical polymerization initiators can be used, as needed, in combination with inorganic reducing agents such as sodium hydrogensulfite and sodium pyrosulfite and organic reducing agents such as cobalt naphthenate and dimethylaniline.

As a solvent for re-precipitating the resulting polymer, water, isopropanol, hexane, methanol and a mixed solvent thereof are preferred.

The coating solution composition to be used in the invention contains the fluorine-free copolymer preferably in a content of from 0.01% by mass to 20% by mass, more preferably in a content of from 0.05% by mass to 15% by mass, and further more preferably in a content of from 0.1% by mass to 10% by mass based on the fluorine-containing copolymer. (In this specification, mass ratio is equal to weight ratio.)

[Fluorine-containing Copolymer]

The low refractive index layer in the anti-reflection film of the invention is formed by curing a composition containing a fluorine-free copolymer (S) containing both a constituent having a polysiloxane structure represented by the foregoing formula (1) in the main chain and a constituent containing a hydroxyl group in the side chain and a fluorine-containing copolymer. Also, the fluorine-containing copolymer is of a structure preferably represented by the formula (3).

Formula (3):

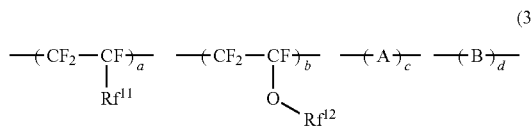

In the formula (3), $Rf^{11}$ represents a perfluoroalkyl group containing from 1 to 5 carbon atoms, and $Rf^{12}$ represents a fluorine-containing alkyl group having a straight, branched or alicyclic structure containing from 1 to 15 carbon atoms and optionally having an ether bond.

Both of the polymerization unit having $Rf^{11}$ and the polymerization unit having $Rf^{12}$ are polymer units based on fluorine-containing vinyl monomers. Specific examples of the fluorine-containing vinyl monomers include fluoroolefinsi (e.g., fluoroethylene, vinylidene fluoride, tetrafluoroethylene, hexafluoroethylene and hexafluoropropylene), perfluoro (alkyl vinyl ethers) (e.g., perfluoro(methyl vinyl ether), perfluoro(ethyl vinyl ether) and perfluoro(propyl vinyl ether)), perfluoro(alkoxyalkyl vinyl ethers) (e.g., perfluoro(propoxypropyl vinyl ether)). These may be used independently or in combination of two or more thereof.

In view of refractive index, solubility, transparency and availability, independent use of hexafluoropropylene or combined use of hexafluoropropyolene and a perfluoro(alkyl vinyl ether) or a perfluoro(alkoxyalkyl vinyl ether) is particularly preferred.

In the formula (3), A represents a polymerization unit based on any vinyl monomer, and is not particularly limited as long as it is a constituent based on a monomer copolymerizable with hexafluoropropylene, with a proper one being properly selected in view of various standpoints such as contribution to low refractive index, adhesion to a substrate, Tg of a resulting polymer (which contributes to film hardness), solubility for a solvent, transparency, surface slipping properties and dust- or stain-proof properties. Plural of these vinyl monomers may be combined according to the purpose, and are introduced in a total content of preferably from 0 to 50 mol %, more preferably from 0 to 40 mol %, particularly preferably from 0 to 30 mol %, based on the copolymer.

The vinyl monomer unit to be used as A is not particularly limited, and examples thereof include olefins (e.g., ethylene, propylene, isoprene, vinyl chloride and vinylidene chloride), acrylic esters (e.g., methyl acrylate, ethyl acrylate, 2-ethylhexyl acrylate and 2-hydroxyethyl acrylate), methacrylic esters (e.g., methyl methacrylate, ethyl methacrylate, butyl methacrylate and 2-hydroxyethyl methacrylate), styrene derivatives (e.g., styrene, p-hydroxymethylstyrene and p-methoxystyrene), fluorine-containing vinyl ethers, vinyl ethers (e.g., methyl vinyl ether, ethyl vinyl ether and cyclohexyl vinyl ether), vinyl esters (e.g., vinyl acetate, vinyl propionate and vinyl cinnamate), unsaturated carboxylic acids (e.g., acrylic acid, methacrylic acid, crotonic acid, maleic acid and itaconic acid), acrylamides (e.g., N,N-dimethylacrylamide, N-t-butylacrylamide and N-cyclohexylacrylamide), methacrylamides (e.g., N,N-dimethylmethacylamide) and acrylonitrile.

Of the vinyl monomers to be used together, vinyl ethers or fluorine-containing vinyl ethers are preferred to introduce in view of further reduce the refractive index.

The copolymer to be used in the invention preferably has the polymerization unit represented by B in the formula (3) and based on the hydroxyl group-containing monomer (hereinafter also referred to as "constituent B") as a constituent. The hydroxyl group functions to react with a cross-linking agent to cure the polymer, and hence a higher content of the hydroxyl group provides a harder film, thus being preferred. As the hydroxyl group-containing vinyl monomer, those which are copolymerizable with the polymerization unit of the aforesaid fluorine-containing monomer, such as vinyl ethers, (meth)acrylates and styrenes, can be used with no particular limitation. For example, in the case where a perfluoroolefin (e.g., hexafluoropropylene) is used as the fluorine-containing monomer, a hydroxyl group-containing vinyl ether having a good copolymerizable ability is preferably used. Specifically, 2-hydroxyethyl vinyl ether, 4-hydroxybutyl vinyl ether, 6-hydroxyhexyl vinyl ether, 8-hydroxyoctyl vinyl ether, diethylene glycol vinyl ether, triethylene glycol vinyl ether and 4-(hydroxymethyl)cyclohexylmethyl vinyl ether are preferred. These hydroxyl group-containing vinyl monomers may be introduced independently or in combination of two or more thereof, and the content thereof is preferably 10 mol % or more, and is more preferably in the range of from 20 mol % to 60 mol %, particularly preferably from 25 to 50 mol %.

a, b, c and d each represents mol % of each constituent, and represent values satisfying the relations of $30 \leq a+b \leq 90$, $5 \leq a \leq 90$, $0 \leq b \leq 70$, $0 \leq c \leq 50$, and $10 \leq d$, preferably $35 \leq a+b \leq 70$, $30 \leq a \leq 60$, $0 \leq b \leq 30$, $0 \leq c \leq 40$, and $20 \leq d \leq 60$, particularly preferably $40 \leq a+b \leq 60$, $40 \leq a \leq 55$, $0 \leq b \leq 20$, $0 \leq c \leq 30$, and $25 \leq d \leq 50$.

The mass-average molecular mass (Mw) of the fluorine-containing copolymer represented by the formula (3) is preferably from $10^3$ to $10^6$, more preferably from $5 \times 10^3$ to $5 \times 10^5$, particularly preferably from $10^4$ to $10^5$.

As a particularly preferred embodiment of the fluorine-containing copolymer to be used in the invention, there are illustrated those which are represented by the following formula (3'). In the formula (3'), $Rf^{11}$, $Rf^{12}$, A, a, b, c and d are the same as defined with respect to the formula (3), and the preferred scopes thereof are also the same as described there.

Formula (3'):

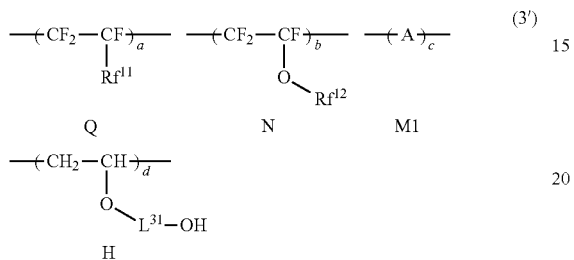

In the formula (3'), $L^{31}$ represents a divalent linking group, preferably a linking group containing from 1 to 6 carbon atoms, particularly preferably a linking group containing from 2 to 4 carbon atoms, which may have a straight or branched structure or a cyclic structure and may have a hetero atom selected from among O, N and S.

Preferred examples of the linking group $L^{31}$ include *—(CH$_2$)$_2$—O—**, *—(CH$_2$)$_2$—NH—**, *—(CH$_2$)$_4$—C—**, *—(CH$_2$)$_6$—O—**, *—(CH$_2$)$_2$—O—(CH$_2$)$_2$—O—**, *—CONH—(CH$_2$)$_3$—O—**, *—CH$_2$CH(OH)CH$_2$—O—** and *—CH$_2$CH$_2$OCONH(CH$_2$)$_3$—O—** (wherein * represents a linking position on the polymer main chain side, and ** represents a linking position on the hydroxyl group side).

(Preferred Examples of Respective Polymerization Units)

Preferred examples of each of the polymerization units in the perfluoroolefin copolymer to be used in the invention represented by the above formula (3') are shown below which, however, do not limit the invention in any way.

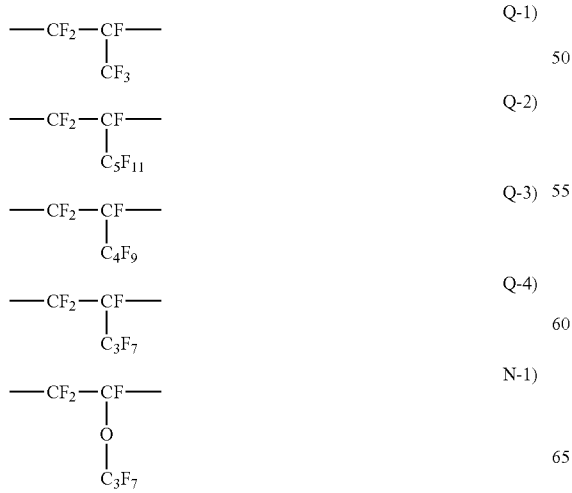

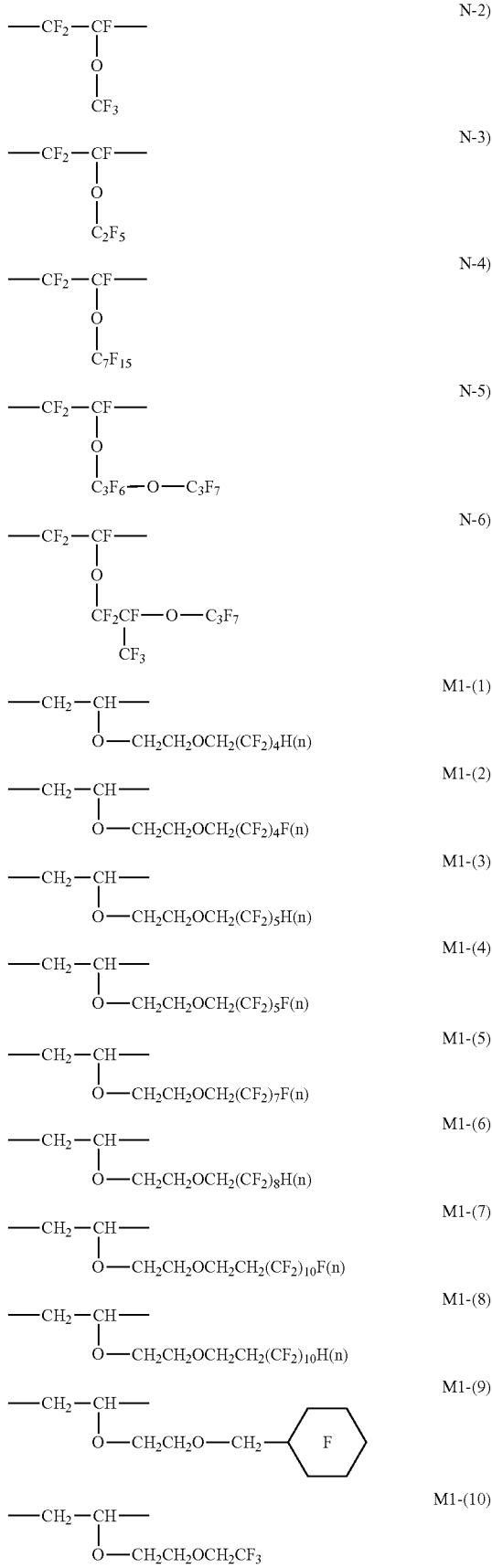

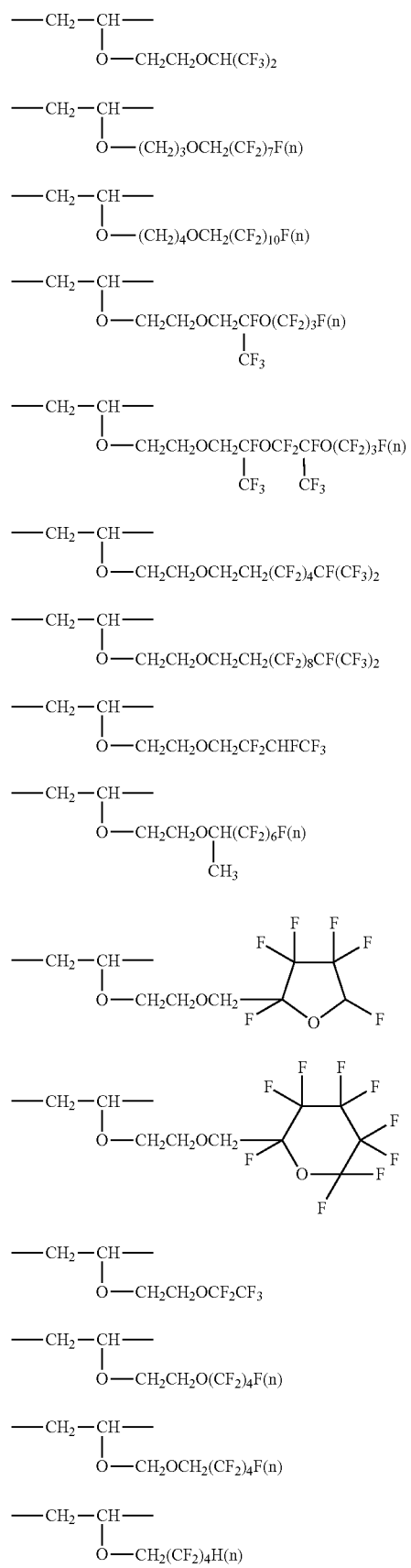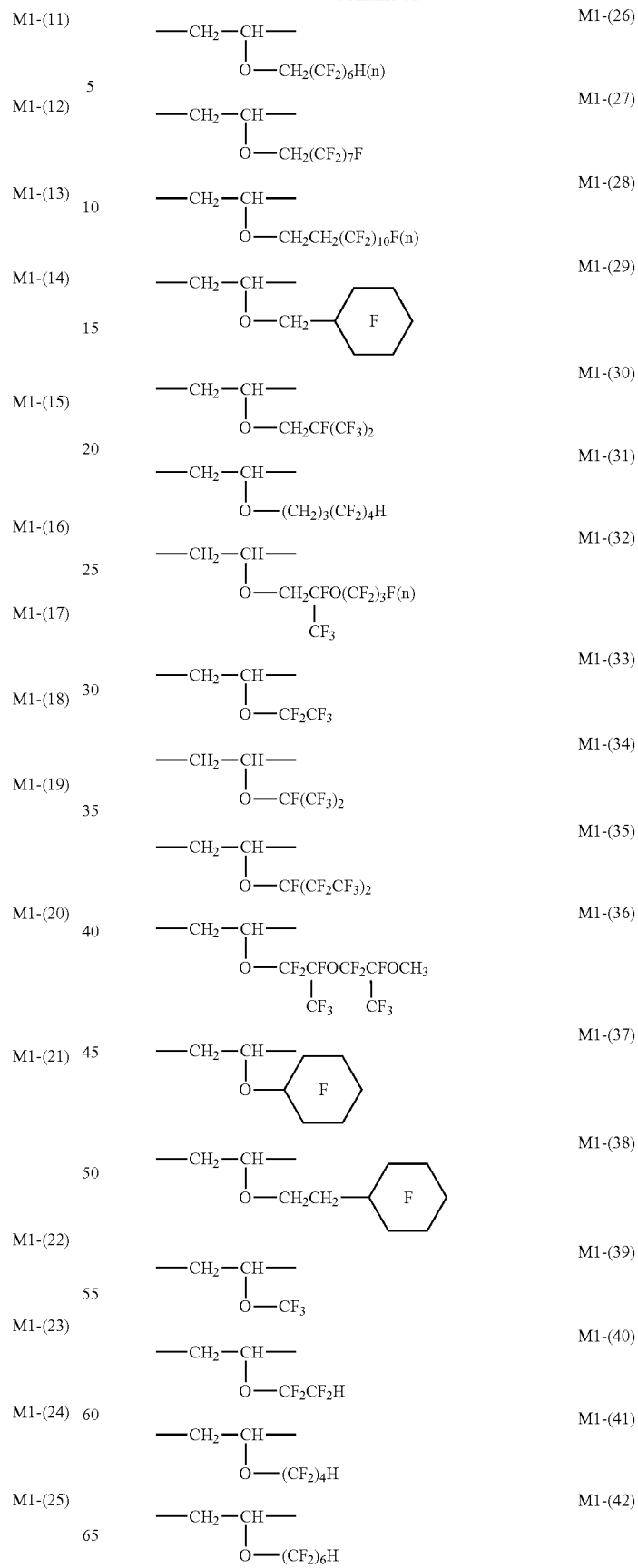

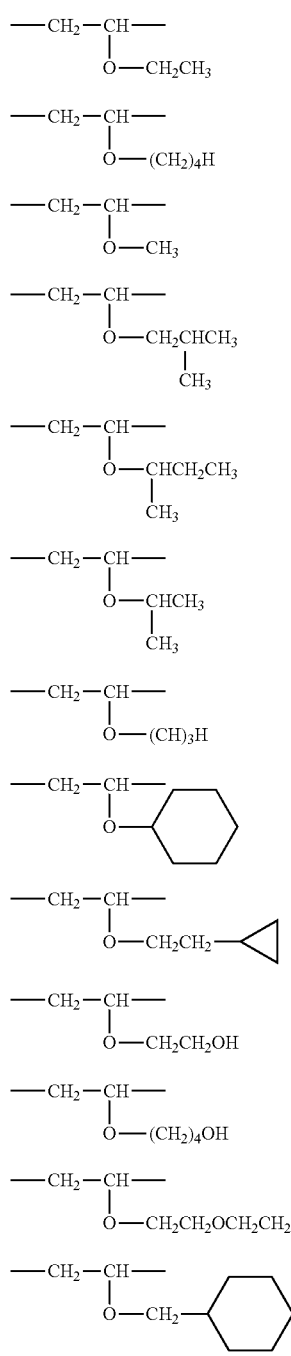

Specific examples of polymers useful in the invention will be shown in Table 2 which, however, do not limit the invention in any way. Additionally, Table 2 gives examples as a combination of polymerization units In Table 2, all symbols Q, N, M1, H and a to d are those which are shown in the foregoing formula (3').

TABLE 2

|  | Q | N | M1 | H | a | b | c | d | Mw |
|---|---|---|---|---|---|---|---|---|---|
| T-1 | Q-1) | — | — | H-1) | 50 | 0 | 0 | 50 | 25000 |
| T-2 | Q-1) | — | — | H-2) | 50 | 0 | 0 | 50 | 28000 |
| T-3 | Q-1) | — | M1-(43) | H-1) | 50 | 0 | 25 | 25 | 37000 |
| T-4 | Q-1) | — | M1-(43) | H-1) | 50 | 0 | 20 | 30 | 38000 |
| T-5 | Q-1) | — | M1-(43) | H-1) | 50 | 0 | 10 | 40 | 33000 |
| T-6 | Q-1) | — | M1-(43) | H-2) | 50 | 0 | 20 | 30 | 39000 |
| T-7 | Q-1) | — | M1-(43) | H-2) | 50 | 0 | 10 | 40 | 34000 |
| T-8 | Q-1) | N-1) | — | H-1) | 40 | 10 | 0 | 50 | 40000 |
| T-9 | Q-1) | N-1) | M1-(43) | H-1) | 40 | 10 | 20 | 30 | 30000 |
| T-10 | Q-1) | — | M1-(1) | H-1) | 50 | 0 | 10 | 40 | 41000 |
| T-11 | Q-1) | N-1) | — | H-2) | 40 | 10 | 0 | 50 | 38000 |
| T-12 | Q-1) | — | M1-(2) | H-1) | 50 | 0 | 10 | 40 | 40000 |
| T-13 | Q-1) | N-6) | — | H-1) | 45 | 5 | 0 | 50 | 50000 |
| T-14 | Q-1) | — | M1-(44) | H-1) | 50 | 0 | 10 | 40 | 42000 |
| T-15 | Q-1) | — | M1-(44) | H-1) | 50 | 0 | 20 | 30 | 36000 |
| T-16 | Q-1) | — | M1-(44) | H-2) | 50 | 0 | 10 | 40 | 38000 |
| T-17 | Q-1) | — | M1-(44) | H-2) | 50 | 0 | 20 | 30 | 39000 |
| T-18 | Q-1) | N-6) | M1-(43) | H-1) | 45 | 5 | 20 | 30 | 42000 |
| T-19 | Q-1) | — | — | H-3) | 50 | 0 | 0 | 50 | 29000 |
| T-20 | Q-3) | — | — | H-1) | 50 | 0 | 0 | 50 | 25000 |
| T-21 | Q-1) | — | M1-(43) | H-1) | 50 | 0 | 30 | 20 | 36000 |
| T-22 | Q-1) | — | M1-(43) | H-2) | 50 | 0 | 40 | 10 | 39000 |
| T-23 | Q-1) | N-1) | M1-(43) | H-1) | 35 | 15 | 35 | 15 | 33000 |
| T-24 | Q-1) | N-1) | M1-(44) | H-1) | 30 | 20 | 35 | 15 | 31000 |
| T-25 | Q-1) | N-1) | M1-(43) | H-1) | 25 | 25 | 40 | 10 | 30000 | a, b, c and d each represents mol fraction (mol %) of each constituent.

(Synthesis of the Fluorine-containing Copolymer)

Synthesis of the fluorine-containing copolymer represented by the formula (3) to be used in the invention can be conducted according to various polymerization processes such as a solution polymerization process, a precipitation polymerization process, a suspension polymerization process, a mass polymerization process and an emulsion polymerization process. In such processes, the synthesizing operation may be conducted in a known manner such as a batch-wise manner, a semi-continuous manner or a continuous manner.

As a method for initiating the polymerization, there are illustrated a method of using a radical initiator and a method of irradiating with light or radiation. These polymerization processes and the methods for initiating polymerization are described in, for example, Teiji Tsuruta, Kobunshi Gosei Hoho, revised edition (published by Nikkan Kogyo Shinbunsha in 1971) and Takayuki Otsu & Masayoshi Kinosita, Kobunsi Gosei No Jikkenho, published by Kagaku Dojin, 1972, pp. 124-154.

Of the above-described polymerization processes, the solution polymerization process using a radical initiator is preferred. As to a solvent to be used for the solution polymerization process, various organic solvents such as ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol and 1-butanol can be used independently, in combination of two or more thereof, or as a mixture with water.

The polymerization temperature is required to be determined depending on the desired molecular mass of the polymer to be produced and the kind of the initiator to be used. The polymerization can be carried out at a temperature ranging from 0° C. or lower to 100° C. or higher, but is preferably carried out in the range of from 50 to 100° C.

The reaction pressure can properly be selected, but is usually from 0.01 to 10 MPa, preferably from 0.05 to 5 MPa, more preferably from 0.1 to 2 MPa. The reaction time is from about 5 to about 30 hours.

The obtained polymer may be applied to the use of the invention in the form of the as-produced reaction solution or after purification by re-crystallization or liquid-separating procedure.

(Curing Agent (Cross-linking Agent)

The coating solution composition for the low refractive index Layer to be used in the anti-reflection film of the invention preferably contains a compound (curing agent) capable of reacting with the hydroxyl group of the fluorine-containing copolymer and/or the polysiloxane-containing copolymer. The curing agent has preferably two or more, more preferably 4 or more, sites capable of reacting with hydroxyl group. The structure of the curing agent is not particularly limited as long as it contains the above-described number of functional groups capable of reacting with hydroxyl group, and examples thereof include polyisocyanates, partial condensates and polymers of isocyanate compounds, adducts with polyhydric alcoholos or low molecular polyester film, blocked polyisocyanate compounds whose isocyanate groups are blocked with a blocking agent such as phenol, aminoplasts, and polybasic acids or the anhydrides thereof.

(Aminoplasts)

In the invention, aminoplasts are particularly preferably used as the cross-linking agents, and are compounds which contain an amino group capable of reacting with the hydroxyl group existing in the fluorine-containing copolymer, i.e., a hydroxyalkylamino group or an alkoxyalkylamino group, or a carbon atom adjacent to nitrogen atom and substituted by an alkoxy group. Specifically, melamine compounds, urea compounds, benzoguanamine compounds and glycoluryl compounds are illustrated.

The melamine compounds are known as compounds which generally have a skeleton wherein nitrogen atoms are connected to a triazine ring, and specific examples thereof include melamine, alkylated melamine, methylolmelamine, and alkoxylated melamine. In particular, methylolated melamine obtained by reacting melamine with formaldehyde under a basic condition, alkoxylated methylmelamine, and derivatives thereof are preferred. In view of storage stability, alkoxylated methylmelamine is particularly preferred. The methylolated melamine and the alkoxylated methylmelamine are not particularly limited and various resins obtained by processes as described in, for example, Plastic Zairyo Koza [8], Urea•melamine Jushi (Nikkan Kogyo Shinbun-sha) may also be used.

Also, as the urea compounds, polymethylolated urea, its derivative of alkokylated methylurea and, further, compounds having a cyclic urea structure of glycoluryl skeleton or 2-imidazolidinone skeelton are also preferred as well as urea. As the amino compounds of the urea derivatives, too, various resins described in the above Urea•melamine Jushi and the like can be used.

As the amino compound to be used in the production of a curable coating solution composition for forming a low refractive index layer to be used in the invention, the melamine compounds or the glycoluryl compounds are particularly preferred in view of compatibility with the fluorine-containing copolymer and the hydroxyl group-containing copolymer having the polysiloxane structure. Further, in view of reactivity, the alkokylated methylmelamine compounds or the glycoluryl compounds are preferred. Of these, compounds which have a nitrogen atom within the molecule and have two or more carbon atoms adjacent to the nitrogen atom and substituted by an alkoxy group are preferred. Particularly preferred compounds are compounds represented by the following structural formulae (H-1) and (H-2) and the partial condensates thereof. In the formulae, R represents an alkyl group containing from 1 to 6 carbon atoms or a hydroxyl group.

Structural formulae (H-1) and (H-2):

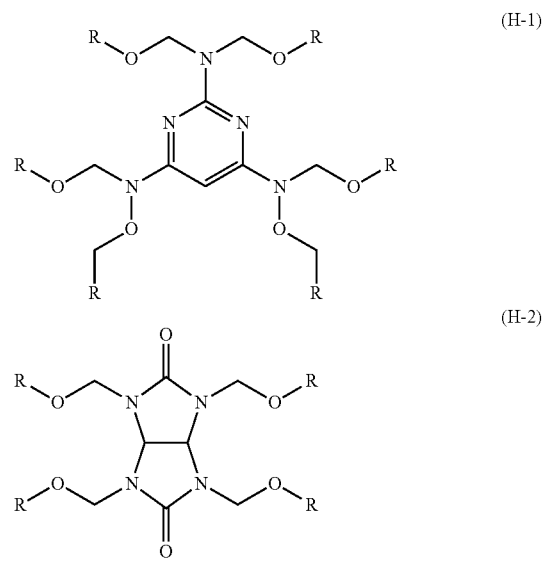

The addition amount of the aminoplast in the coating solution composition for forming the low refractive index layer is from 1 to 50 parts by mass, preferably from 3 to 40 parts by mass, more preferably from 5 to 30 parts by mass, per 100 parts by mass of the total mass of the fluorine-containing copolymer and the polysiloxane structure-containing and hydroxyl group-containing copolymer. When the amount is 1 part by mass or more, the resulting film has an enough durability as a thin film, which is the characteristic aspect of the invention and, when the amount is less than 50 parts by mass, the refractivity of the film can be maintained at a low level, which is the characteristic aspect of the material of the invention upon applying it to optical uses, thus such amounts being preferred. From the standpoint that, even when a curing agent is added, the refractive index is kept at a low level, curing agents which increase the refractive index only in a small amount when added to the composition are preferred. From this standpoint, of the above-described compounds, the compounds having a skeleton represented by H-2 are more preferred.

(Curing Catalyst)

Curing of the low refractive index layer in the invention is accelerated by an acid catalyst, and hence addition of the acidic substance is desirable. In order to obtain both storage stability and curing activity, it is more preferred to add a compound which generates an acid upon being heated (thermal acid generating agent) and/or a compound which generates an acid upon being irradiated with light (light-sensitive acid generating agent).

(Thermal Acid Generating Agent)

The thermal acid generating agent which can be compounded in the curable coating solution composition for forming a low refractive index layer to be used in the invention (hereinafter also referred to as "curable resin composition for forming the low refractive index layer" or merely as "curable resin composition") is a substance which can render the heating condition more moderate upon curing the coated film of the curable resin composition by heating.

Specific examples of the thermal acid generating agent include various aliphatic sulfonic acids and the salts thereof, various aliphatic carboxylic acids (e.g., citric acid, acetic acid and maleic acid) and the salts thereof, various aromatic carboxylic acids (e.g., benzoic acid and phthalic acid) and the salts thereof, alkylbenzenesulfonic acids and the ammonium salts or various metal salts thereof, phosphoric acid and phosphates of organic acids.

The amount of the thermal acid generating agent to be used is preferably from 0 to 10 parts by mass, more preferably from 0.1 to 5 parts by mass, per 100 parts by mass of the sum of the fluorine-containing copolymer and the polysiloxane structure- and hydroxyl group-containing copolymer in the curable resin composition. In case when the amount is too excessive, storage stability of the curable resin composition becomes deteriorated, thus such amount not being preferred.
(Light-sensitive Acid Generating Agent)

The light-sensitive acid generating agent which can be compounded in the curable resin composition to be used in the invention is a substance which imparts light sensitivity to the coated film of the curable resin composition to make it possible to photo-cure the coated film by, for example, irradiating with radiation such as light.

Typical examples of the light-sensitive acid generating agent include (1) various onium salts such as iodonium salts, sulfonium salts, phosphonium salts, diazonium salts, ammonium salts and pyridinium salts; (2) sulfone compounds such as β-keto esters, β-sulfonylsulfones and α-diazo compounds thereof; (3) sulfonates such as alkylsulfonates, haloalkylsulfonates, arylsulfonates and iminosulfonates; (4) sulfonimide compounds represented by the following formula (5); (5) diazomethane compounds represented by the following formula (6); and others.

Formula (5):

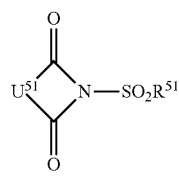

(5)

In the formula, $U^{51}$ represents a divalent group such as an alkylene group, an arylene group or an alkoxylene group, and $R^{51}$ represents a monovalent group such as an alkyl group, an aryl group, a halogen-substituted alkyl group or a halogen-substituted aryl group.

Formula (6):

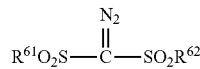

(6)

In the formula, $R^{61}$ and $R^{62}$ may be the same or different from each other, and each represents a monovalent group such as an alkyl group, an aryl group, a halogen-substituted alkyl group or a halogen-substituted aryl group.

The light-sensitive acid generating agents may be used independently or in combination of two or more thereof or, further, in combination with the thermal acid generating agent. The amount of the light-sensitive acid generating agent to be used is preferably from 0 to 20 parts by mass, more preferably from 0.1 to 10 parts by mass, per 100 parts by mass of the sum of the mass of the fluorine-containing copolymer and the mass of the polysiloxane structure- and hydroxyl group-containing copolymer in the curable resin composition. When the amount is equal to or less than the upper limit, there results a cured film with an excellent hardness and a good transparency, thus such amount being preferred.

It is also preferred for the low refractive index layer in the invention to further contain inorganic fine particles or an organosilane compound to be described hereinafter in the curable resin composition containing the above-described at least two copolymers, i.e., the fluorine-containing copolymer and the polysiloxane structure- and hydroxyl group-containing copolymer, the curing agent and the curing catalyst.
(Inorganic Fine Particles for the Low Refractive Index Layer)

The amount of the inorganic fine particles to be incorporated in the low refractive index layer is preferably from 1 to 100 mg/m$^2$, more preferably from 5 to 80 mg/m$^2$, still more preferably from 10 to 60 mg/m$^2$. When the amount of the inorganic fine particles is equal to or more than the lower limit, there results a remarkable effect of improving scratching resistance whereas, when the amount is equal to or less than the upper limit, there results such fine unevenness on the surface of the low refractive index layer that troubles such as deterioration of the external appearance including tightness of the black color and integrated reflectivity never take place, thus amounts within the range being preferred.

Since the inorganic fine particles are incorporated in the low refractive index layer, they have preferably a low refractive index. Examples thereof include fine particles of magnesium fluoride and silica. In view of refractive index, dispersion stability and production cost, fine particles of silica are particularly preferred.

The size of the inorganic fine particles is preferably from 1 to 200 nm, more preferably from 5 to 90 nm. When the particle size of the inorganic fine particles is equal to or larger than the lower limit, there results a large effect of improving scratching resistance whereas, when the particle size is equal to or less than the upper limit there results such fine unevenness on the surface of the low refractive index layer that troubles such as deterioration of the external appearance including tightness of the black color and integrated reflectivity never take place, thus amounts within the range being preferred.

The inorganic fine particles may be crystalline or amorphous, and may be mono-disperse particles or, when satisfying predetermined particle size requirement, agglomerated particles. As to the shape of the particles, particles of a spherical shape is most preferred, but particles of an amorphous shape may be employed with no troubles.
(Organosilane Compounds)

In the invention, the low refractive index layer may be formed from a curable resin composition further containing an organosilane compound. The definition of the organosilane compound and the structure of preferred compounds are the same as described in JP-A-2004-331812, paragraphs [0137] to [0138].
(Other Additives)

The coating solution composition for forming the low refractive index layer of the invention, i.e., the curable resin composition, contains at least the fluorine-containing copolymer and the polysiloxane structure- and hydroxyl group-containing copolymer, and is prepared by adding thereto, as needed, a curing agent, a curing catalyst, inorganic fine particles and an organosilane compound and, further, barious additives and a radical polymerization initiator or a cation polymerization initiator and dissolving these in a proper solvent. In this occasion, the concentration of the solid components is properly selected depending upon the use but, in general, it is in the range of from about 0.01 to abut 60% by mass, preferably from about 0.5 to about 50% by mass, particularly preferably from about 1 to about 20% by mass.

In view of interfacial adhesion to the underlayer in a direct contact with the low refractive index layer, a curing agent such as a polyfunctional (meth)acrylate compound, a polyfunctional epoxy compound, a polyisocyanate compound, an aminoplast, a polybasic acid or an anhydride thereof may be added to the composition in a small amount. In the case of adding them, the addition amount thereof is preferably 30% by mass or less, more preferably 20% by mass or less, particularly preferably 10% by mass or less, based on the mass of the total solid components in the low refractive index layer film.

Also, for the purpose of imparting characteristic properties such as stain-proof properties, water resistance, chemical resistance and surface slipping properties, stain-proofing agents such as known silicone series compounds or fluorine-containing compounds and slipping agents may properly be added in addition to the above-described organosilane compound. In the case of adding these additives, the addition amount is in the range of preferably from 0.01 to 20% by mass, more preferably from 0.05 to 10% by mass, particularly preferably from 0.1 to 5% by mass, based on the mass of the whole solid components in the low refractive index layer.

(Silicone Series Compounds)

As preferred examples of the silicone series compounds, there are illustrated compounds which contain plural repeating units of dimethylsilyloxy units and have substituents at the end and/or side chain of the compound chain. Also, constitutional units other than the dimethylsilyloxy unit may be contained in the chain of the compound containing the dimethylsilyloxy as a repeating unit.

The substituents may be the same or different from each other, with presence of plural substituents being preferred. Preferred examples of the substituents include an acryloyl group, a methacryloyl group, a vinyl group, an aryl group, a cinnamoyl group, an epoxy group, an oxetanyl group, a hydroxyl group, a fluoroalkyl group, a polyoxyalkylene group, a carboxyl group and an amino group.

The molecular mass of the silicone series compound is not particularly limited, but is preferably equal to or less than 100,000, particularly preferably equal to or less than 50,000, most preferably from 3,000 to 30,000.

The silicon atom content of the silicone series compound is not particularly limited, but is preferably equal to or more than 18.0% by mass, particularly preferably from 25.0 to 37.8% by mass, most preferably from 30.0 to 37.0% by mass.

Preferred examples of the silicone series compound include "X-22-174DX", "X-22-2426", "X-22-164B", "X22-164C", "X-22-170DX", "X-22-176D" and "X-22-1821" (these being trade names) manufactured by Shin-Etsu Chemical Co., Ltd.; "FM-0725", "FM-7725", "FM-4421", "FM-5521", "FM-6621" and "FM-1121" manufactured by Chisso Corp.; "DMS-U22", "RMS-033", "RMS-083", "UMS-182", "DMS-H21", "DMS-H31", "HMS-301", "FMS121", FMS123", "FMS131", "FMS141" and "FMS221" (these being trade names) manufactured by Gelest. However, these are not limitative at all.

(Fluorine-containing Compounds)

As the fluorine-containing compounds, fluoroalkyl group-containing compounds are preferred. The fluoroalkyl group contains preferably from 1 to 20 carbon atoms, more preferably from 1 to 10 carbon atoms, and may be a straight chain {e.g., $-CF_2CF_3$, $-CH_3(CF_3)_4H$, $-CH_2(CF_2)_8CF_3$ or $-CH_2CH_2(CF_2)_4H$} or may have a branched structure {e.g., $-CH(CF_3)_2$, $-CH_2CF(CF_3)_2$, $-CH(CH_3)CF_2CF_3$ or $-CH(CH_3)(CF_2)_5CF_2H$}, an alicyclic structure (preferably a 5- or 6-membered ring, e.g., a perfluorocyclohexyl group, a perfluorocyclopentyl group or an alkyl group substituted by these groups), and may have an ether bond (e.g., $-CH_2OCH_2CF_2CF_3$, $-CH_2CH_2OCH_2C_4F_8H$, $-CH_2CH_2OCH_2CH_2C_8F_{17}$ or $-CH_2CH_2OCF_2CF_2OCF_2CF_2H$). A plurality of the fluoroalkyl groups may be contained in the same molecule.

The fluorine-containing compound preferably has a substituent which contributes to formation of bond with the low refractive index layer or to compatibility. A plurality of such substituents which may be the same or different are preferably contained. Preferred examples of such substituents include an acryloyl group, a methacryloyl group, a vinyl group, an aryl group, a cinnamoyl group, an epoxy group, an oxetanyl group, a hydroxyl group, a polyoxyalkylene group, a carboxyl group and an amino group. The fluorine-containing compound may be a polymer or oligomer with a fluorine-free compound with no particular limitation as to molecular mass thereof.

The content of fluorine atom in the fluorine-containing compound is not particularly limited, but is preferably equal to or more than 20% by mass, particularly preferably from 30 to 70% by mass, most preferably from 40 to 70% by mass. Preferred examples of the fluorine-containing compound include "R-2020", "M-2020", "R-3833" and "M-3833" (these being trade names) manufactured by Daikin Industries; "Megafac F-171", "Megafac F-172", Megafac F-179A" and "Defencer MCF-300" (these being trade names) manufactured by Dainippon Ink & Chemicals, Inc. However, these are not limitative at all.

(Dust-proofing Agent, Antistatic Agent, Etc.)

The curable resin composition for forming the low refractive index layer may further properly contain dust-proofing agents and antistatic agents such as known cationic surfactants of polyoxyelkylene compounds for the purpose of imparting characteristic properties such as dust-proofing properties and antistatic properties to the composition. These dust-proofing agents and the antistatic agents may be incorporated in the above-described silicone series compounds or the fluorine-containing compounds as part of the structural units.

In the case of adding these as additives, they are added in an amount ranging preferably from 0.01 to 20% by mass, more preferably from 0.05 to 10% by mass, particularly preferably from 0.1 to 5% by mass, based on the mass of the whole solid components in the low refractive index layer.

Preferred examples of the compounds include "Megafac F150" (trade name) manufactured by Dainippon Ink & Chemicals, Inc. and "SH-3748" (trade name) manufactured by Toray Dow-Corning which, however, are not limitative at all.

(Solvent for Forming the Low Refractive Index Layer by Coating)

As a solvent to be used in the invention for the coating solution composition for forming the low refractive index layer, various solvents can be used which are selected from the standpoints that respective components can be dissolved or dispersed therein, that a uniform surface state can easily be obtained in the coating step and the drying step, that solution stability can be obtained, and that they have a proper saturated vapor pressure. In view of reducing drying load, it is preferred to incorporate a solvent mixture containing a solvent having a boiling temperature of 100° C. or tower at ordinary pressure and room temperature as a major component and, for adjusting drying speed, a small amount of a solvent having a boiling point of 100° C. or higher.

Examples of the solvent having a boiling point of 100° C. or lower include hydrocarbons such as hexane (b.p. 68.7° C.), heptane (98.4° C.), cyclohexane (80.7° C.) and benzene (80.1° C.); halogenated hydrocarbons such as dichloromethane (39.8° C.), chloroform (61.2° C.), carbon tetrachloride (76.8° C.), 1,2-dichloroethane (83.5° C.) and trichloroethylene (87.2° C.); ethers such as diethyl ether (34.6° C.), diisopropyl ether (68.5° C.), dipropyl ether (90.5° C.) and tetrahydrofuran (66° C.); esters such as ethyl formate (54.2° C.), methyl acetate (57.8° C.), ethyl acetate (77.1° C.) and isopropyl acetate (89° C.); ketones such as acetone (56.1° C.) and 2-butanone (or methyl ethyl ketone, 79.6° C.); alcohols such as methanol (64.5° C.), ethanol (78.3° C.), 2-propanol (82.4° C.) and 1-propanol (97.2° C.); cyano compounds such as acetonitrile (81.6° C.) and propionitrile (97.4° C.); and carbon disulfide (46.2° C.). Of these, ketones and esters are preferred, with ketones being particularly preferred. Of the ketones, 2-butanone is particularly preferred.

Examples of the solvent having a boiling point of 100° C. or higher include octane (125.7° C.), toluene (110.6° C.), xylene (138° C.), tetrachloroethylene (121.2° C.), chlorobenzene (131.7° C.), dioxane (101.3° C.), dibutyl ether (142.4° C.), isobutyl acetate (118° C.), cyclohexanone (155.7° C.), 2-methyl-4-pentanone (or methyl isobutyl ketone (MIBK), 115.9° C.), 1-butanol (117.7° C.), N,N-dimethylformamide (153° C.), N,N-dimethylacetamide (166° C.) and dimethylsulfoxide (189° C.), with cyclohexanone and 2-methyl-4-pentanone being preferred.

(Layer Structure of the Optical Film)

The anti-reflection film of the invention comprises a transparent substrate having formed thereon, as needed, a hard coat layer to be described hereinafter, and having laminated thereon several layers in consideration of refractive index, film thickness, number of layers and the order of layers so as to reduce reflectance owing to optical interference.

With a low-reflective anti-reflection film, the simplest structure is a structure wherein only a low refractive index layer is provided by coating on a substrate. In order to more reduce the reflectance, it is preferred to constitute the anti-reflective layer by combining a high refractive index layer having a higher refractive index than that of the substrate and a low refractive index layer having a lower refractive index than that of the substrate. As examples of the layer structure, there are a two-layer structure of the high refractive index layer/low refractive index layer from the substrate side and a three-layer structure wherein three layers different from each other in refractive index are laminated in the order of a middle refractive index layer (having a higher refractive index than that of the substrate or the hard coat layer and a lower refractive index than that of the high refractive index layer)/high refractive index layer/low refractive index layer. Layer structures formed by laminating more anti-reflective layers have also been proposed.

Preferred examples of the layer structure of the anti-reflection film of the invention will be shown below. In the following structures, the substrate film functions as a support.

Substrate film/low refractive index layer
Substrate film/antistatic layer/low refractive index layer
Substrate film/anti-glare layer/low refractive index layer
Substrate film/anti-glare layer/antistatic layer/low refractive index layer
Substrate film/antistatic layer/anti-glare layer/low refractive index layer
Substrate film/hard coat layer/anti-glare layer/low refractive index layer
Substrate film/hard coat layer/anti-glare layer/antistatic layer/low refractive index layer
Substrate film/hard coat layer/antistatic layer/anti-glare layer/low refractive index layer
Substrate film/hard coat layer/high refractive index layer/low refractive index layer
Substrate film/hard coat layer/antistatic layer/high refractive index layer/low refractive index layer
Substrate film/hard coat layer/middle refractive index layer/high refractive index layer/low refractive index layer
Substrate film/anti-glare layer/high refractive index layer/low refractive index layer
Substrate film/anti-glare layer/middle refractive index layer/high refractive index layer/low refractive index layer
Substrate film/antistatic layer/hard coat layer/middle refractive index layer/high refractive index layer/low refractive index layer
Antistatic layer/substrate film/hard coat layer/middle refractive index layer/high refractive index layer/low refractive index layer
Substrate film/antistatic layer/anti-glare layer/middle refractive index layer/high refractive index layer/low refractive index layer
Antistatic layer/substrate film/anti-glare layer/middle refractive index layer/high refractive index layer/low refractive index layer
Antistatic layer/substrate film/anti-glare layer/high refractive index layer/low refractive index layer/high refractive index layer/low refractive index layer The layer structure is not limited only to these layer structures as long as the reflectance can be reduced due to optical interference. The high refractive index layer may be a light-diffusing layer exerting no anti-glare function. The antistatic layer is preferably a layer containing electrically conductive polymer particles or metal oxide fine particles (e.g., ATO or ITO), and can be provided by coating or by plasma treatment under atmospheric pressure.

[Layers Other than the Low Refractive Index Layer]
[Film-forming Binders]

In the invention, use of compounds having an ethylenically unsaturated group as a main film-forming binder component of the film-forming composition which forms other layer than the low refractive index layer is preferred in view of film strength, stability of the coating solution and productivity of a coated film. The main film-forming binder is a binder which amounts to 10% by mass or more, preferably from 20% by mass to 100% by mass, more preferably from 30% by mass to 95% by mass, of the film-forming components, excluding inorganic particles.

The binder is preferably a polymer having a saturated hydrocarbon chain or a polyether chain as a main chain, with a polymer having a saturated hydrocarbon chain as a main chain being more preferred. As the binder polymer having a saturated hydrocarbon chain as a main chain and having a cross-linked structure, (co)polymers of a monomer having two or more ethylenically unsaturated groups are preferred.

In order to increase the refractive index of a formed film, it is preferred to incorporate in the structure of the monomer an aromatic ring or at least one atom selected from among a halogen atom except for a fluorine atom, a sulfur atom, a phosphorus atom and a nitrogen atom.

Examples of the monomer having two or more ethylenically unsaturated groups include esters between a polyhydric alcohol and (meth)acrylic ester {e.g., ethylene glycol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri (meth)acrylate, dipentaerythritol tetra(meth)acrylate, dipentaerythritol penta(meth)acrylate, dipentaerythritol hexa (meth)acrylate, pentaerythritol hexa(meth)acrylate, 1,2,3-cyclohexane tetramethacrylate, polyurethane polyacrylate and polyester polyacrylate}, vinylbenzene and the derivatives thereof (e.g., 1,4-divinylbenzene, 2-acryloylethyl 4-vinylbenzoate and 1,4-divinylcyclohexane), vinylsulfones (e.g., divinylsulfone), acrylamides (e.g., methylenebisacrylamide) and methacrylamides. The monomers may be used in combination of two or more thereof.

Additionally, in this specification, the term "(meth)acrylate" means "acrylate or methacrylate".

Specific examples of high refractive index monomer include bis(4-metbacryloylthiophenyl)sulfide, vinylnaphthalene, vinylphenylsulfide and 4-methacryloxyphenyl 4-methoxyphenyl thioether. These monomers may also be used in combination of two or more thereof.

Polymerization of monomers having an ethylenically unsaturated group can be performed by irradiating with ionizing radiation or heating in the presence of a photo radical polymerization initiator or a thermal radical initiator.

Examples of the photo radical polymerization initiator include acetophenones, benzoins, benzophenones, phosphine oxides, ketals, anthraquinones, thioxanthones, azo compounds, peroxides, 2,3-dialkyldione compounds, disulfide compounds, fluoroamine compounds and aromatic sulfonium compounds.

Examples of the acetophenones include 2,2-diethoxyacetophenone, p-dimethylacetophenone, 1-hydjroxydimethylphenylketone, 1-hydroxycyclohexylphenylketone, 2-methyl-4-methylthio-2-morpholinopropiophenone and 2-benzyl-2-dimethylamino-1-(4-morpholinophenyl)butanone.

Examples of benzoins include benzoin benzenesulfonate, benzoin toluenesulfonate, benzoin methyl ether, benzoin ethyl ether and benzoin isopropyl ether.

Examples of benzophenones include benzophenone, 2,4-dichlorobenzophenone, 4,4-dichlorobenzophenlone and p-chlorobenzophenone. Examples of phosphine oxides include 2,4,6-trimethylbenzoyldiphenylphosphine oxide.

Also, various examples are described in Saishin UV Koka Gijutsu (New UV Curing Technology), p. 159 (published by Kazuhiro Takabo; publishing company: Kabushiki Kaisha Gijutsu Joho Kyokai; 1991) and are useful in the invention.

As a commercially available photo-cleavage type photo radical polymerization, there are illustrated "Irgacure (651, 184, 907)" manufactured by Ciba Specialty Chemicals.

The photo polymerization initiator is used in an amount ranging preferably from 0.1 to 15 parts by mass, more preferably from 1 to 10 parts by mass, per 100 parts by mass of the polyfunctional monomer.

In addition to the photo polymerization initiator, a photosensitizer may be used. Specific examples of the photo-sensitizer include n-butylamine, triethylamine, tri-n-butylphosphine, Michler's ketone and thioxanthone.

As the thermal radical initiator, organic or inorganic peroxides, and organic azo and diazo compounds may be used. Specifically, there are illustrated organic peroxides such as benzoyl peroxide, benzoyl halogenoperoxide, lauroyl peroxide, acetyl peroxide, dibutyl peroxide, cumene hydroperoxide and butyl hydroperoxide; inorganic peroxides such as hydrogen peroxide, ammonium persulfate and potassium persulfate; azo compounds such as 2-azobisisobutyronitrile, 2-azobispropionitrile and 2-azobiscyclohexanedinitrile; and diazo compounds such as diazoaminobenzene and p-nitrobenzenediazonium.

The thermal radical initiator is used in an amount ranging preferably from 0.1 to 15 parts by mass, more preferably from 1 to 10 parts by mass, per 100 parts by mass of the polyfunctional monomer.

In the invention, polymers having polyether as a main chain may also be used. Ring opening polymerization products of polyfunctional epoxy compounds are preferred. Ring opening polymerization of a polyfunctional epoxy compound can be conducted by irradiation with ionizing radiation or heating in the presence of a light-sensitive acid generating agent or a thermal acid generating agent.

It is also possible to introduce a cross-linkable functional group by using a monomer having a cross-linkable functional group in place of, or in addition to, the monomer having two or more ethylenically unsaturated groups, and introduce a cross-linked structure by the reaction of the cross-linkable group.

Examples of the cross-linkable functional group include an isocyanato group, an epoxy group, an aziridine group, an oxazoline group, an aldehydro group, a carbonyl group, a hydrazine group, a carboxyl group, a methylol group and an active methylene group. Vinylsulfonic acid, acid anhydrides, cyanoacrylate derivatives, melamine, etherified methylol, esters, urethane and metal alkoxides such as tetramethoxysilane can also be utilized as a monomer for introducing the cross-linked structure. It is also possible to use a functional group which shows cross-linking properties as a result of decomposition reaction, such as a blocked isocyanato group. That is, in the invention, the cross-linkable functional group may be a group which does not immediately show reactivity but show reactivity as a result of decomposition.

The binder polymer having such cross-linkable functional group can form a cross-linked structure upon being heated.

[Hard Coat Layer]

(Materials for Hard Coat Layer)

In the invention, it is preferred to provide a hard coat layer. The hard coat layer can be formed by a binder and, as needed, matt particles for imparting anti-glare properties, and an inorganic filler for increasing refractive index, preventing shrinkage due to cross-linking and increasing strength.

(Matt Particles)

Matt particles of from 0.1 to 5.0 μm, preferably from 1.5 to 3.5 μm, in average particle size, such as particles of an inorganic compound or resin particles may be incorporated in the hard coat layer for the purpose of imparting anti-glare properties.

The difference in refractive index between the matt particles and the binder is preferably from 0.02 to 0.20, particularly preferably from 0.04 to 0.10 because, when the difference is too large, there results a white turbid film whereas when the difference is too small, sufficient light-diffusing effect can not be obtained. The addition amount of the matt particles to the binder is preferably from 3 to 30% by mass, particularly preferably from 5 to 20% by mass similarly because, when the addition amount is too large, there results a white turbid film whereas when the amount is too small, sufficient light-diffusing effect can not be obtained.

Preferred specific examples of the matt particles include particles of inorganic compounds such as silica particles and $TiO_2$ particles; and resin particles such as acrylic particles, cross-linked acrylic particles, polystyrene particles, cross-linked styrene particles, melamine resin particles and benzoguanamine resin particles. Of these, cross-linked styrene particles, cross-linked acrylic particles and silica particles are preferred.

As to the shape of the matt particles, either of spherical particles and amorphous particles may be used.

It is possible to use two or more different kinds of matt particles.

In the case of using two or more different kinds of matt particles, the difference in refractive index between the two kinds of matting particles is preferably from 0.02 to 0.10, particularly preferably from 0.03 to 0.07, for the mixed particles to give an effectively controlled refractive index. It is also possible to impart anti-glare properties by matt particles having a larger particle size or to impart different optical properties by matt particles having a smaller particle size. For example, in the case of sticking an anti-reflection film onto a highly fine display of 133 ppi or more, an optical trouble called dazzling is required to be avoided. Dazzling is caused by the unevenness of the film surface (contributing to anti-glare properties) which enlarges or shrinks pixels to lose uniformity of luminance. This can be markedly prevented by using together matt particles having a smaller particle size than that of the matt particles to be used for imparting anti-glare properties and having a different refractive index from that of the binder.

Further, as to particle size distribution of the matt particles, a monodisperse system is most preferred, and, the nearer the particle sizes of individual particles to one and the same particle size, the more preferred. For example, when particles having a particle size larger than the average particle size by 20% are defined as coarse particles, the proportion of the coarse particles is preferably 1% or less, more preferably 0.1% or less, still more preferably 0.01% or less, based on the population of the total particles. Matt particles having such particle size distribution can be obtained by classification after ordinary synthesis reaction, and matt particles having a more preferred particle size distribution can be obtained by increasing the number of classification or strengthening the classification degree.

The matt particles are incorporated in the hard coat layer in an amount so that the amount of the matt particles in the formed hard coat layer becomes preferably from 10 to 1000 mg/m$^2$, more preferably from 100 to 700 mg/m$^2$.

The particle size distribution of matt particles is measured according to the Coulter counter method, and the measured distribution is converted to particle number distribution.

(Inorganic Fillers)

In order to increase the refractive index of the hard coat layer and reduce shrinkage upon curing, it is preferred to incorporate inorganic fillers of 0.2 μm or less, preferably 0.1 μm or less, more preferably 0.06 μmor less, in average particle size which comprise an oxide of at least one metal selected from among titanium, zirconium, aluminum, indium, zinc, tin and antimony, in addition to the matt particles.

Also, in order to enlarge the refractive index gap between the inorganic fillers and the matt particles, it is preferred to use a silicon oxide for keeping at a low level the refractive index of the hard coat layer using the matt particles having a high refractive index. As to preferred particle size of the silicon oxide, the particle size range described with respect to the inorganic fillers applies.

Specific examples of the inorganic fillers to be used in the hard coat layer include $TiO_2$, $ZrO_2$, $Al_2O_3$, $In_2O_3$, ZnO, $SnO_2$, $Sb_2O_3$, ITO and $SiO_2$, with $TiO_2$ and $ZrO_2$ being particularly preferred in view of increasing the refractive index.

It is also preferred to subject the surface of the inorganic fillers to silane coupling treatment or titanium coupling treatment. A surface treating agent having a functional group capable of reacting with the binder species is preferably applied to the filler surface.

The addition amount of the inorganic fillers is preferably from 10 to 90% by mass, more preferably from 20 to 80% by mass, particularly preferably from 30 to 70% by mass, based on the total mass of the hard coat layer.

Additionally, such fillers have a particle size small enough not to cause scattering, and a dispersion body wherein the fillers are dispersed in a binder polymer acts as an optically uniform substance.

The refractive index of the balk of a mixture of the binder and the inorganic filler for the hard coat layer in the invention is preferably from 1.48 to 2.00, more preferably from 1.50 to 1.80. In order to adjust the refractive index to the range, it suffices to properly select kinds and amounts of the binder and the inorganic filler. Which ones to select can be easily known through previous experiments.

The thus-formed anti-reflection film of the invention has a haze value in the range of from 3 to 70%, preferably from 4 to 60%, and an average reflectance for a light of 450 nm to 650 nm equal to or less than 3%, preferably equal to or less than 2.5%. The anti-reflection film of the invention having a haze value and an average reflectance within the above-described ranges can provide good anti-glare properties and anti-reflection properties without deterioration of a transmitted image.

[Support]

As a transparent support of the anti-reflection film of the invention, plastic films are preferably used. Examples of polymers for forming the plastic films include cellulose esters (e.g., triacetyl cellulose and diacetyl cellulose; typically "TAC-TD80U" and "TAC-TD80UF" manufactured by Fuji Photo Film Co., Ltd.), polyamides, polycarbonates, polyesters (e.g., polyethylene terephthalate and polyethylene naphthalate), polystyrene, polyolefins, norbornene resins {ARTON (trade name) manufactured by JSR Corp.} and amorphous polyolefins {ZEONEX (trade name) manufactured by ZEON CORP.} Of these, triacetyl cellulose, polyethylene terephthalate and polyethylene naphthalate are preferred, with triacetyl cellulose being particularly preferred.

Also, cellulose acylate films substantially containing no halogenated hydrocarbons such as dichloromethane and processes for their production are described in Hatsumei Kyokai Kokai Giho (Kogi No. 2001-1745, published on Mar. 15, 2001; hereinafter abbreviated as "Kokai Giho 2001-1745"), and cellulose acylates described there can also be preferably used in the invention.

[Saponification Treatment]

In the case of using the anti-reflection film of the invention for an image display device, the film is disposed on the outermost surface of the display by providing an adhesive layer on one side of the film. In the case where the transparent support of the anti-reflection film is triacetyl cellulose, it is preferred in view of production cost to use the anti-reflection of the film as it is as the protective film since triacetyl cellulose is used as a protective film for protecting a polarizing film of a polarizing plate.

In the case of disposing the anti-reflection film of the invention on the outermost surface of a display by providing an adhesive layer on one side of the anti-reflection film or of using the anti-reflection film as it is as a protective film for a polarizing plate, it is preferred to form the outermost layer containing the polysiloxane structure- and hydroxyl group-having copolymer and the fluorine-containing copolymer as major components on a transparent support and subject it to saponification treatment.

The saponification treatment is performed in a known manner by, for example, dipping the film in an alkali solution for an appropriate period of time. After dipping the film in an alkali solution, the film is well washed with water and is preferably dipped in a dilute acid to thereby neutralize so that the alkali component does not remain in the film. The saponification treatment renders hydrophilic the surface of the transparent support on the opposite side to the side having the outermost layer.

The hydrophilized surface is particularly effective for improving adhesion to a polarizing film containing polyvinyl alcohol as a major component. Also, since dusts in the air difficulty adhere to the hydrophilized surface, dusts difficulty intervene between the polarizing film and the anti-reflection film upon adhesion of the anti-reflection film to the polarizing film, thus saponification treatment being effective for preventing spot deficiency due to the dusts.

The saponification treatment is preferably performed so that the contact angle of the surface of the support on the opposite side to the side having the outermost layer becomes 40° or less, more preferably 30° or less, particularly preferably 20° or less.

Specific means for the saponification treatment can be selected from the following two means (1) and (2). Means (1) is superior in that the treatment can be conducted in the same step as is used for general-purpose triacetyl cellulose film. However, since the anti-reflection film surface is also subjected to the saponification treatment, two points that the surface thereof undergoes alkali hydrolysis to suffer deterioration of the film and that, when the solution for the saponification treatment remains, it might form stain can become problematical. In such case, means (2) is superior, though a special step is required.
(1) After forming an anti-reflective layer on a transparent support, the anti-reflection film is dipped in an alkali solution at least one time to thereby subjecting the back side of the film to the saponification treatment.
(2) Before or after forming an anti-reflective layer on a transparent support, an alkali solution is coated on the surface of the transparent support opposite to the surface on which an anti-reflective layer of the anti-reflection film is coated, and the film is heated, washed with water and/or neutralized to thereby subject only the back side of the film to the saponification treatment.

[Method for Forming a Coated Film]

The anti-reflection film of the invention can be formed according to the following methods which, however, are not limitative at all.

First, coating solutions containing components for forming individual layers are prepared. Each coating solution is coated on a transparent support according to a dip coating method, an air-knife coating method, a curtain coating method, a roller coating method, a wire-bar coating method, a gravure coating method or an extrusion coating method (see, U.S. Pat. No. 2,681,294), followed by heating and drying.

Of these coating methods, a gravure coating method is preferred because it can coat a coating solution which is used in only a small amount like coating solutions for individual layers of the anti-reflection film in a highly uniform thickness. With the gravure coating method, a micro-gravure coating method is more preferred since it can coat the solution in a highly uniform thickness.

Also, a die coating method can coat a coating solution which is used in only a small amount in a highly uniform thickness. Further, with the die coating method, it is comparatively easy to control film thickness because of the pre-metering system thereof. In addition, the evaporation amount of a solvent in the coating section is small, thus the die coating method being preferred.

With an anti-reflection film composed of a plurality of layers, two or more layers may be coated at the same time. Such simultaneously coating methods are described in U.S. Pat. Nos. 2,761,791, 2,941,898, 3,508,947 and 3,526,528 and Kotingu Kogaku (Coating Engineering) by Yuji Harazaki, Asakura Shoten (1973), page 253.

<Use of Anti-reflection Film>
[Polarizing Plate]

A polarizing plate mainly comprises two protective films sandwiching a polarizing film from both sides thereof. The anti-reflection film of the invention is preferably used as at least one of the two protective films sandwiching the polarizing film from both sides thereof. Production cost of the polarizing plate can be reduced by allowing the anti-reflection film of the invention to serve as both the anti-reflection film and the protective film. Also, reflection of external light can be prevented by using the anti-reflection film of the invention as the outermost layer, thus a polarizing plate having excellent scratching resistance and stain-proof properties being obtained.

[Polarizing Film]

As a polarizing film, a known polarizing film or a polarizing film cut out from a continuous polarizing film whose absorption axis is neither parallel nor vertical to the longitudinal direction.

The continuous polarizing film whose absorption axis is neither parallel nor vertical to the longitudinal direction can be produced according to the following method. That is, it can be produced by a stretching method of stretching a continuously supplied polymer film to impart tensile strength wherein both edges of the continuously supplied polymer film are held by holding means so that the film is stretched at least in the width direction of the film with a stretch ratio of from 1.1 to 20.0 times the original, the difference in the longitudinal migration speed between the holding devices for respective edges of the film is within 3%, and the film-running direction is inclined with holding both edges of the film so that the angle between the film-running direction at the outlet of the step of holding both edges of the film and the direction of substantially stretching the film becomes from 20 to 70°. In particular, a method of inclining 45° is preferably employed in view of productivity.

As to the method for stretching a polymer film, detailed descriptions are given in JP-A-2002-86554, paragraphs [0020] to [0030].

[Image Display Device]

The image display device of the invention is an image display device wherein the anti-reflection film or the polarizing plate is used on the outermost surface of the display. For example, in an embodiment using it on one side of a surface-protecting film of a polarizing film, it can preferably be used in a transmission type, reflection type or semi-transparent type liquid crystal display device of twisted nematic (TN) mode, super-twisted nematic (STN) mode, vertical alignment (VA) mode, in-plane switching (IPS) mode or optically compensated bend cell (OCB) mode.

VA mode liquid crystal cells include:
(1) a VA mode liquid crystal cell in the narrow sense (JP-A-2-176625) wherein rod-like liquid crystal molecules are aligned substantially vertically while voltage is not applied, and the molecules are aligned substantially horizontally while voltage is applied;

(2) a liquid crystal cell (of MVA mode) (described in SID97, Digest of tech. Papers, (Yokoshu), 28 (1997), in which the VA mode is modified to be multi-domain type so as to enlarge the viewing angle;
(3) a liquid crystal cell of n-ASM mode (described in Nihon Ekishou Toronkai no Yokoshu (Abstracts of Japanese Forum of Liquid Crystal), (1998), pp. 58 to 59, in which rod-like liquid crystal molecules are substantially vertically aligned while voltage is not applied, and the molecules are substantially oriented in twisted multi-domain alignment while voltage is applied; and
(4) a cell of SURVAIVAL mode (presented in LCD International '98.

A polarizing plate prepared by combining a biaxially stretched triacetyl cellulose film with the anti-reflection film of the invention is preferably used for a VA mode liquid crystal cell. As to the process for preparing the biaxially stretched triacetyl cellulose film, those processes are preferably employed which are described in, for example, JP-A-2001-249223 and JP-A-2003-170492.

The liquid crystal cell of OCB mode is a liquid crystal cell of bend alignment mode in which rod-like liquid crystal molecules in upper part and ones in lower part are substantially reversely (symmetrically) aligned. A liquid crystal display device having the liquid crystal cell of bend alignment mode is disclosed in U.S. Pat. Nos. 4,583,825 and 5,410,422. Since rod-like liquid crystal molecules in upper part and ones in lower part are symmetrically aligned, the liquid crystal cell of bend alignment mode has self-optical compensatory function. Therefore, this mode is also referred to as OCB (Optically Compensatory Bend) mode. The liquid crystal display of bend alignment mode has an advantage of responding rapidly.

A liquid crystal cell of ECB mode, in which rod-like liquid crystal molecules are aligned substantially horizontally while voltage is not applied, is most popularly utilized as a color TFT liquid crystal display device and is described in many literatures. For example, it is described in EL, PDP, LCD Display {published by Toray Research Center (2001)}.

In particular, with TN mode or IPS mode liquid crystal display devices, a polarizing plate having both the anti-reflection effect and the viewing angle-enlarging effect with a thickness of a single polarizing plate can be obtained by using an optically compensatory film having the viewing angle-enlarging effect on the opposite side of one of two protective films provided on both sides of the polarizing plate to the anti-reflection film of the invention, as described in JP-A-2001-100043, thus being particularly preferred.

EXAMPLES

The invention is described in more detail by reference to Examples which, however, do not limit the invention in any way. Additionally, in the following Examples and Synthesis Examples, % is by mass unless otherwise specified.
<Preparation of Anti-reflection Film>
[Synthesis of Polysiloxane Structure- and Hydroxyl Group-having Copolymer]

Synthesis Example 1

Synthesis of (P-1)

10 g of methyl ethyl ketone was placed in a three-necked flask having an inner volume of 200 mL, and the temperature was raised to 80° C. under stirring. After sufficiently replacing the atmosphere in the flask with nitrogen, a mixture of 10.0 g of a high molecular initiator having the structural formula {S-(1)}, "VPS-1001" (manufactured by Wako Pure Chemical Industries, Ltd., 0.5 g of hydroxyethyl methacrylate (HEMA) and 30 g of methyl ethyl ketone was dropwise and completely added thereto through a chemical pump over 3 hours under stirring. After completion of the dropwise addition, stirring was continued for further 5 hours, and then the reaction mixture was cooled to room temperature. The polymerization solution was added to a mixed solvent of water/methanol=400 mL/40 mL to thereby precipitate a polymer, followed by drying in vacuo at 50° C. to obtain 8.5 g of a polysiloxane structure- and hydroxyl group-having copolymer (P-1). The thus-obtained polymer had a mass-average molecular mass of 38,000.

Synthesis Examples 2 to 7

Synthesis of (P-2), (P-3), (P-5), (P-9), (P-17) and (P-19)

In about the same manner as in synthesis of (P-1) in Synthesis Example 1, there were synthesized (P-2), (P-3), (P-5), (P-9), (P-17) and (P-19). The mol fraction (mol %) of each polymerization unit and the mass-average molecular mass are as set forth in the foregoing Table 1.
[Synthesis of Fluorine-containing Copolymer]

Synthesis 11

Synthesis of (T-1)

40 ml of ethyl acetate, 14.7 g of hydroxyethyl vinyl ether (HEVE) and 0.55 g of dilauroyl peroxide were placed in a stainless steel-made autoclave having an inner volume of 100 mL, and the atmosphere within the system was removed and replaced by a nitrogen gas. 25 g of hexafluoropropylene (HFP) was introduced into the autoclave, and the temperature was raised to 65° C. The pressure at the time when the temperature within the autoclave reached 65° C. was 5.4 kg/cm². The reaction was continued for 8 hours with keeping the temperature at the same level and, when the pressure reached 3.2 kg/cm², heating was stopped and the system was allowed to cool. When the inside temperature decreased to room temperature, unreacted monomers were purged and the autoclave was opened to take out a reaction solution. The thus-obtained reaction solution was added to a large excess of hexane, followed by removing the solvent by decantation to collect a precipitated polymer. Further, this polymer was dissolved in a small amount of ethyl acetate and reprecipitated twice from hexane to completely remove remaining monomers. After drying, 28 g of a fluorine-containing copolymer (T-1) of 1:1 in hexafluoropropylene/hydroxyethyl vinyl ether molar ratio was obtained. The thus obtained polymer had a mass-average molecular mass of 25,000.

Synthesis Examples 12 to 14

Synthesis of (T-2), (T-4), (T-5) and (T-8)

In about the same manner as in synthesis of (T-1) in Synthesis Example 11, there were synthesized (T-2), (T-4), (T-5) and (T-8). The mol fraction (mol %) of each polymerization unit and the mass-average molecular mass are as set forth in the foregoing Table 2.

Comparative Synthesis Example 1

Synthesis of Comparative Copolymer (U-1)

A comparative copolymer (U-1) of the following structure wherein a copolymer moiety having the polysiloxane structure was introduced in an amount of 2% by mass was obtained by conducting polymerization under the same conditions as in Synthesis Example 11 except for further adding 0.6 g of a high molecular initiator "VPS-1001". The mass-average molecular mass of the resulting polymer was 60,000.

Comparative Copolymer (U-1):

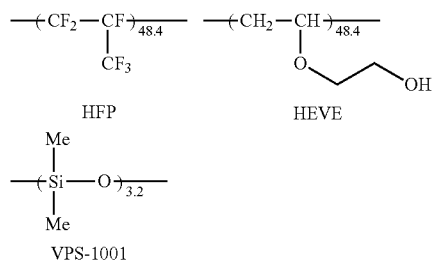

Comparative Synthesis Example 2

Synthesis of Comparative Copolymer (U-2)

40 ml of ethyl acetate, 2.20 g of hydroxyethyl vinyl ether (HEVE), and 12.92 g of a high molecular initiator having the structural formula {S-(1)}, "VPS-1001" (manufactured by Wako Pure Chemical Industries, Ltd.) and 0.40 g of dilauroyl peroxide were placed in a stainless steel-made autoclave having an inner volume of 100 mL, and the atmosphere within the system was removed and replaced by a nitrogen gas. 4.2 g of hexafluoropropylene (HFP) was introduced into the autoclave, and the temperature was raised to 65° C. The pressure at the time when the temperature within the autoclave reached 65° C. was 4.4 kg/cm². The reaction was continued for 10 hours with keeping the temperature at the same level and, when the pressure reached 2.2 kg/cm², heating was stopped and the system was allowed to cool. When the inside temperature decreased to room temperature, unreacted monomers were purged and the autoclave was opened to take out a reaction solution.

The thus-obtained reaction solution was added to a large excess of methanol, and the obtained polymer was dissolved in a small amount of ethyl acetate and reprecipitated twice to completely remove remaining monomers. By drying the polymer under reduced pressure, fluorine-containing copolymer (U-2) having polysiloxane segment was obtained. The thus-obtained polymer had a mass-average molecular mass of 31,000.

Comparative Copolymer (U-2):

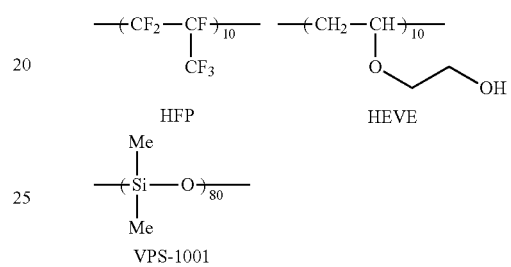

[Preparation of Anti-reflection Film]

Examples 1-1 to 1-20 and Comparative Examples 1-1 to 1-5

[Preparation of Coating Solutions (Ln-1 to Ln-20) for Forming a Low Refractive Index Layer]

Individual components shown in Table 3 were mixed and dissolved in 2-butanone to prepare compositions for forming low refractive index layers which contain 6% by mass of solid components. Numerals within the parentheses represent parts by mass of individual components.

TABLE 3

| | | Formulation of a coating solution for forming a low refractive index layer | | | | | | | |
|---|---|---|---|---|---|---|---|---|---|
| | | Polysilooxane structure-containing copolymer | | Fluorine-containing copolymer | | Curing agent | | Curing catalyst | Colloidal silica |
| | No. | Kind | Amount | Kind | Amount | Kind | Amount | | Amount |
| Present invention | Ln1 | P-1 | 3 | T-1 | 80 | H-11 | 20 | PTS | — |
| Present invention | Ln2 | P-1 | 3 | T-1 | 80 | H-21 | 20 | PTS | — |
| Present invention | Ln3 | P-1 | 3 | T-1 | 80 | CY303 | 20 | PTS | — |
| Present invention | Ln4 | P-1 | 1.7 | T-1 | 50 | H-11 | 20 | PTS | 30 |
| Present invention | Ln5 | P-1 | 3.2 | T-1 | 90 | H-11 | 10 | PTS | — |
| Present invention | Ln6 | P-1 | 3.2 | T-2 | 90 | CY303 | 10 | PTS | — |
| Present invention | Ln7 | P-2 | 3 | T-1 | 80 | H-11 | 20 | PTS | — |
| Present invention | Ln8 | P-2 | 3 | T-1 | 90 | H-21 | 10 | PTS | — |
| Present invention | Ln9 | P-3 | 2.5 | T-2 | 60 | H-21 | 20 | PTS | 20 |
| Present invention | Ln10 | P-3 | 3 | T-1 | 80 | CY303 | 20 | PTS | — |
| Present invention | Ln11 | P-5 | 3.2 | T-1 | 90 | H-11 | 10 | PTS | — |
| Present invention | Ln12 | P-9 | 3 | T-1 | 80 | H-21 | 20 | PTS | — |
| Present invention | Ln13 | P-9 | 3 | T-2 | 50 | CY303 | 30 | PTS | 20 |
| Present invention | Ln14 | P-10 | 3 | T-1 | 80 | H-21 | 20 | PTS | — |
| Present invention | Ln15 | P-11 | 3 | T-1 | 90 | CY303 | 10 | PTS | — |
| Present invention | Ln16 | P-1 | 2 | T-4 | 50 | H-11 | 30 | PTS | 20 |
| Present invention | Ln17 | P-2 | 3 | T-5 | 80 | H-21 | 20 | PTS | — |

TABLE 3-continued

Formulation of a coating solution for forming a low refractive index layer

| | No. | Polysilooxane structure-containing copolymer Kind | Amount | Fluorine-containing copolymer Kind | Amount | Curing agent Kind | Amount | Curing catalyst | Colloidal silica Amount |
|---|---|---|---|---|---|---|---|---|---|
| Present invention | Ln18 | P-3 | 3 | T-9 | 90 | H-11 | 10 | PTS | — |
| Present invention | Ln19 | P-5 | 3 | T-11 | 80 | H-21 | 20 | PTS | — |
| Present invention | Ln20 | P-25 | 3 | T-5 | 60 | CY303 | 20 | PTS | 20 |

Additionally, in Table 3, colloidal silica represents "MEK-ST" manufactured by Nissan Chemical Industries, Ltd., and CY303 represents methylolated melamine "Cymel 303" manufactured by Nippon Cytec Industries Inc. H-11 and H-21 represent compounds of the following structures, respectively. PTS represents p-toluenesulfonic acid monohydrate.

[Preparation of Coating Solutions (Lnr-1 to Lnr-5) for Forming Low Refractive Index Layers for Comparative Examples]

Individual components shown in Table 4 were mixed and dissolved in 2-butanone to prepare compositions for forming low refractive index layers for Comparative Examples which contained 6% by mass of solid components. Numerals within the parentheses represent parts by mass of individual components, and abbreviations are the same as described above.

TABLE 4

Formulation of a coating solution for forming a low refractive index layer

| | No. | Fluorine-containing copolymer Kind | Amount | Polysilooxane structure-containing copolymer Kind | Amount | Curing agent Kind | Amount | Curing catalyst | Colloidal silica Amount |
|---|---|---|---|---|---|---|---|---|---|
| Comparative Example | Lnr 1 | T-1 | 80 | — | — | H-11 | 20 | PTS | — |
| Comparative Example | Lnr 2 | U-1 | 80 | — | — | H-11 | 20 | PTS | — |
| Comparative Example | Lnr 3 | T-1 | 80 | U-2 | 3 | H-11 | 20 | PTS | — |
| Comparative Example | Lnr 4 | T-1 | 50 | — | — | H-11 | 20 | PTS | 30 |
| Comparative Example | Lnr 5 | U-1 | 50 | — | — | H-11 | 20 | PTS | 30 |

H-11

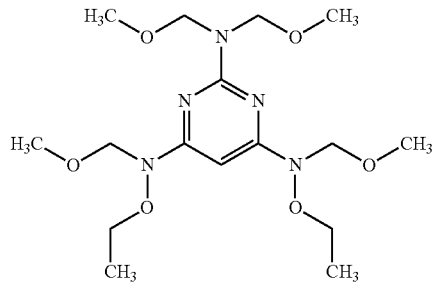

H-21

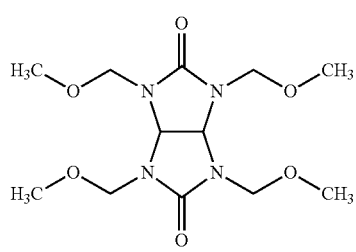

[Preparation of a Composition (HC-1) for Forming a Hard Coat Layer]

| | |
|---|---|
| "PET-30" | 50.0 g |
| "Irgacure 184" | 2.0 g |
| "SX-350" (30% by mass) | 1.5 g |
| Cross-linked acryl-styrene particles (30% by mass) | 13.9 g |
| "KBM-5103" | 10.0 g |
| Toluene | 38.5 g |

The above-described mixed solution was filtered through a polypropylene-made filter of 30 μm in pore size to prepare a composition (HC-1) for forming a hard coat layer.

Compounds used are shown below.

"PET-30": A mixture of pentaerythritol triacrylate and pentaerythritol tetraacrylate (manufactured by Nippon Kayaku).

"Irgacure 184": A polymerization initiator (manufactured by Ciba Specialty Chemicals).

"SX-350": A 30% by mass dispersion in toluene of crosslinked polystyrene particles of 3.5 μm in average particle size (refractive index: 1.60; manufactured by Soken Kagaku Co., Ltd.; used after dispersing in a polytron dispersing machine at 10,000 rpm for 20 minutes).

Cross-linked acryl-styrene particles: A 30% by mass dispersion in toluene of cross linked acryl-styrene particles of 3.5 μm in particle size (refractive index: 1.55; manufactured by Soken Kagaku Co., Ltd.; used after dispersing in a polytron dispersing machine at 10,000 rpm for 20 minutes).

"KBM-5103": Acryloyloxypropyltrimethoxysilane (manufactured by Shin-Etsu Chemical Co., Ltd.).

[Preparation of Anti-reflection Film]

A 80-μm thick triacetyl cellulose film "TAC-TD80U" (manufactured by Fuji Photo Film Co., Ltd.) was wound off from a roll, and the above-described composition (HC-1) for forming a hard coat layer was directly coated thereon using a micro-gravure roll of 50 mm in diameter having a gravure pattern of 180 lines/in in line number and 40 μm in depth and using a doctor blade under the conditions of 30 rpm in gravure roll rotation number and 30 m/min in conveying speed and, after drying at 60° C. for 150 seconds, the coated layer was irradiated with UV rays of 400 mW/cm$^2$ in illuminance and 110 mJ/cm$^2$ in irradiation amount using a 160 W/cm air-cooled metal halide lamp (Eyegraphics Co., Ltd.) at an oxidation density of 0.1% by volume under purging with nitrogen to thereby cure the coated layer and form a 6-μm thick layer, followed by winding up the thus-treated film. The thus-formed hard coat layer of the sample had a surface roughness of Ra-0.18 μm and Rz-1.40 μm and had a haze of 35%.

On the thus-formed hard coat layer was applied each of the compositions for forming low refractive index layers (Ln1 to 20 of the invention and Lnr 1 to 5 for Comparative Examples) with adjusting the film thickness of the low refractive index layer to thereby prepare anti-reflection films (101) to (120) and (R01) to (R05). Drying conditions for the low refractive index layer were 120° C. and 10 minutes, and UV ray curing was conducted with an illuminance of 120 mW/cm$^2$ and an irradiation amount of 240 mJ/cm$^2$ using a 240 W/cm air-cooled metal halide lamp (manufactured by Eyegraphics Co., Ltd.) while purging with nitrogen to adjust the oxygen concentration to 0.01% by volume or less. Combinations of the composition for forming the hard coat layer and the composition for forming the low refractive index layer, used for forming the resulting anti-reflection films are shown in Table 5.

[Saponification Treatment of Anti-reflection Film]

The resulting anti-reflection films were treated and dried under the following standard conditions.
(1) Alkali bath: 1.5 mol/L sodium hydroxide aqueous solution, 55° C.-120 seconds
(2) First water-washing bath: running water, 60 seconds
(3) Neutralizing bath: 0.05 mol/L sulfuric acid, 30° C.-20 seconds
(4) Second water-washing bath: running water, 60 seconds
(5) Drying: 120° C.-60 seconds

[Evaluation of Anti-reflection Film]

The following evaluations were conducted using the thus-obtained saponified anti-reflection films. Results thus obtained are shown in Table 5.

(Evaluation 1) Measurement of Average Reflectance

The spectral reflectance was measured at an incident angle of 5° in the wavelength region of from 380 to 780 nm using a spectrophotometer "V-550" (manufactured by JASCO Corporation) and an integrating sphere. In evaluating the spectral reflectance, an average reflectance of from 450 to 650 nm was used.

The measurement was conducted on a black support after subjecting the back side of the anti-reflection film to a coarsening treatment and conducting light-absorbing treatment (transmittance at 380 to 780 nm being less than 10%) with a black ink.

(Evaluation 2) Scratching Resistance (1)—Evaluation of Resistance Against Steel Wool A rubbing test was conducted under the following conditions using a rubbing tester.
Environmental conditions upon evaluation: 25° C., 60% RH
Rubbing member: Steel wool "No. 0000" (manufactured by Japan Steel Wool Corp.) was wound around a rubbing tip (1 cm×1 cm) of a tester to be in contact with a sample and was fixed with a band so as not to shift. Then, rubbing stroke was applied thereto under the following conditions.
Stroke distance (one way): 13 cm, rubbing speed: 13 cm/sec.
Load: 200 g/cm$^2$
Area in contact with the tip: 1 cm×1 cm
Rubbing stroke number: 10 strokes.

An oily black ink was applied to the back side of a thus-rubbed sample, and the sample was visually viewed using a reflected light to evaluate scratches in the rubbed portion according to the following standard.
O: No scratches were observed with extremely careful observation.
OΔ: Slight scratches were observed with extremely careful observation.
Δ: Weak scratches were observed.
Δx: Middle-level scratches were observed.
x: Scratches were observed at a glance.

(Evaluation 3) Scratching Resistance (2)—Evaluation of Resistance Against Rubbing with an Eraser A rubbing test was conducted under the following conditions using a rubbing tester. Environmental conditions upon evaluation: 25° C., 60% RH
Rubbing member: A plastic eraser ("MONO" manufactured by Tombow Pencil Co., Ltd.) was fixed at a rubbing tip (1 cm×1 cm) of a tester to be in contact with a sample.
Stroke distance (one way): 4 cm, rubbing speed: 2 cm/sec.
Load: 500 g/cm$^2$
Area in contact with the tip: 1 cm×1 cm
Rubbing stroke number: 100 strokes An oily black ink was applied to the back side of a thus-rubbed sample, and the sample was visually viewed using a reflected light to evaluate scratches in the rubbed portion according to the following standard.
O: No scratches were observed with extremely careful observation.
OΔ: Slight scratches were observed with extremely careful observation.
Δ: Weak scratches were observed.
Δx: Middle-level scratches were observed.
x: Scratches were observed at a glance.
xx: Scratches were formed all over the surface.

(Evaluation 4) Evaluation of Adhesion by a Felt-tip Pen

As an index for stain-proof properties of the surface, the optical sample was conditioned at 25° C. and 60% RH for 2 hours, and a felt-tip pen "Magic Ink" (trade name) was applied to the surface, followed by wiping the surface with cleaning cloth. The wiped state was observed to evaluate the "Magic Ink" adhesion properties as follows.
OO: Trace of "Magic Ink" was completely wiped off.
O: Trace of "Magic Ink" was slightly observed.
Δ: Trace of "Magic Ink" was a little observed.
x: Trace of "Magic Ink" was scarcely wiped off.

TABLE 5

| | | Composition for forming each layer | | Results of evaluation of anti-reflection film | | | |
|---|---|---|---|---|---|---|---|
| | | | | Average reflectance | Scratching resistance | | MI*3 |
| | | Hard coat layer | Low refractive index layer | (%) | SW*1 | Eraser*2 | Adhesion Properties |
| Example 1-1 | 101 | HC-1 | Ln 1 | 1.83 | ○ | ○ | ○○ |
| Example 1-2 | 102 | HC-1 | Ln 2 | 1.84 | ○ | ○ | ○○ |
| Example 1-3 | 103 | HC-1 | Ln 3 | 1.82 | ○ | ○ | ○○ |
| Example 1-4 | 104 | HC-1 | Ln 4 | 1.83 | ○ | ○ | ○○ |
| Example 1-5 | 105 | HC-1 | Ln 5 | 1.83 | ○ | ○ | ○○ |
| Example 1-6 | 106 | HC-1 | Ln 6 | 1.82 | ○ | ○ | ○○ |
| Example 1-7 | 107 | HC-1 | Ln 7 | 1.84 | ○ | ○ | ○○ |
| Example 1-8 | 108 | HC-1 | Ln 8 | 1.83 | ○ | ○ | ○○ |
| Example 1-9 | 109 | HC-1 | Ln 9 | 1.82 | ○ | ○ | ○○ |
| Example 1-10 | 110 | HC-1 | Ln 10 | 1.85 | ○ | ○ | ○○ |
| Example 1-11 | 111 | HC-1 | Ln 11 | 1.84 | ○ | ○ | ○○ |
| Example 1-12 | 112 | HC-1 | Ln 12 | 1.82 | ○ | ○ | ○○ |
| Example 1-13 | 113 | HC-1 | Ln 13 | 1.83 | ○ | ○ | ○○ |
| Example 1-14 | 114 | HC-1 | Ln 14 | 1.83 | ○ | ○ | ○○ |
| Example 1-15 | 115 | HC-1 | Ln 15 | 1.84 | ○ | ○ | ○○ |
| Example 1-16 | 116 | HC-1 | Ln 16 | 1.84 | ○ | ○ | ○○ |
| Example 1-17 | 117 | HC-1 | Ln 17 | 1.85 | ○ | ○ | ○○ |
| Example 1-18 | 118 | HC-1 | Ln 18 | 1.85 | ○ | ○ | ○○ |
| Example 1-19 | 119 | HC-1 | Ln 19 | 1.84 | ○ | ○ | ○○ |
| Example 1-20 | 120 | HC-1 | Ln 20 | 1.83 | ○ | ○ | ○○ |
| Comparative Example 1-1 | R01 | HC-1 | Lnr 1 | 1.86 | ○ | ○Δ | x |
| Comparative Example 1-2 | R02 | HC-1 | Lnr 2 | 1.87 | ○Δ | ○Δ | Δ |
| Comparative Example 1-3 | R03 | HC-1 | Lnr 3 | 1.84 | ○ | ○ | Δ○ |
| Comparative Example 1-4 | R04 | HC-1 | Lnr 4 | 1.85 | ○ | ○Δ | x |
| Comparative Example 1-5 | R05 | HC-1 | Lnr 5 | 1.85 | ○Δ | Δ | Δ |

SW*1 steel wool
Eraser*2 resistance against rubbing with an eraser
MI*3 "Magic Ink" (trade name)

As is apparent from Examples, the anti-reflection films of the invention are found to have an extremely low surface reflectance, a sufficiently tough film strength and excellent stain-proof properties. Also, since the anti-reflection films of the present invention contain the polysiloxane-containing copolymer of the invention excellent in surface-localizing properties, they have more excellent stain-proof properties than the samples of Comparative Examples (Film Nos. R01, R02, R03, R04 and R05). In addition, since the anti-reflection films of the invention have a high hydroxyl group content, they have more excellent scratching resistance than the sample of Comparative Examples (Film No. R01, R02, R04 and R05).

<Preparation of an Image Display Device>

Examples 2-1 to 2-20 and Comparative Examples 2-1 to 2-5

Each of the antireflection films (Film Nos. 101 to 120 and R01 to R05) prepared in Examples and Comparative Examples described above was stuck onto the surface of a liquid crystal display device "PC9821NS/340W" manufactured by NEC to prepare image surface display samples. Degree of reflection of external image due to surface reflection was visually evaluated with each sample.

Image display samples provided with the anti-reflection films (Film Nos. 101 to 120) of Examples of the invention showed almost no reflection of external image and showed pleasant viewing properties while having a sufficient surface strength. On the other hand, image display samples provided with the anti-reflection films (Film Nos. R01 to R05) of Comparative Examples showed insufficient surface resistance, though reflection of external image being prevented to some extent.

INDUSTRIAL APPLICABILITY

The composition to be used in the invention forms a film having a low refractive index and excellent surface slipping properties and having an excellent strength. An anti-reflection film having a low refractive index layer obtained by curing this composition has a high anti-reflection performance, excellent stain-proof properties, excellent scratching resistance, and excellent adhesion to a substrate member. A polarizing plate and a liquid crystal display device using this anti-reflection film have the advantage that reflection of external light is sufficiently prevented and that they show high stain-proof properties and scratching resistance.

The entire disclosure of each and every foreign patent application from which the benefit of foreign priority has been claimed in the present application is incorporated herein by reference, as if fully set forth.

The invention claimed is:

1. An anti-reflection film, which comprises:
a low refractive index layer that is formed by curing a coating solution composition comprising: a fluorine-free copolymer containing a constituent having a polysiloxane structure represented by formula (1) in a main chain and a constituent containing a hydroxyl group in a side chain; and a fluorine-containing copolymer:

Formula (1)

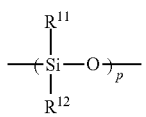

wherein $R^{11}$ and $R^{12}$ each independently represents a hydrogen atom, an alkyl group or an aryl group; and p represents an integer of from 10 to 500;

wherein the fluorine-free copolymer is represented by Formula (2)

Formula (2)

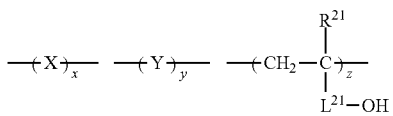

wherein

X represents the constituent containing the polysiloxane structure represented by formula (1):

Y represents a polymer unit based on any vinyl monomer which may be constituted by a single component or may be constituted by plural components;

$R^{21}$ represents a hydrogen atom or a methyl group;

$L^{21}$ represents a divalent linking group containing —COO—; and x to z each represents a mol fraction (%) of each constituent, with x to z satisfying $10 \leq x < 100$, $0 \leq y \leq 50$, $0 < z \leq 50$, and $0 < y+z \leq 90$.

2. The anti-reflection film according to claim 1, wherein the fluorine-containing copolymer is represented by formula (3):

Formula (3)

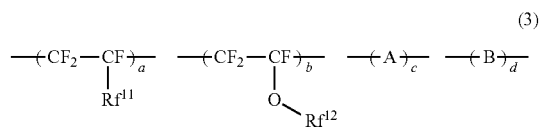

wherein $Rf^{11}$ represents a perfluoroalkyl group containing from 1 to 5 carbon atoms;

$Rf^{12}$ represents a fluorine-containing alkyl group containing from 1 to 30 carbon atoms, having a straight, branched or alicyclic structure and optionally having an ether bond;

B represents a polymer unit based on a hydroxyl group-containing monomer;

A represents a polymer unit based on any vinyl monomer which may be constituted by a single component or plural components; and a to d each represents a mol fraction (%) of each constituent, with a to d satisfying
$30 \leq a+b \leq 90$, $5 \leq a \leq 90$, $0 \leq b \leq 70$, $0 \leq c \leq 50$, and $10 \leq d$.

3. The anti-reflection film according to claim 1, wherein the coating solution composition for forming the low refractive index layer further comprises a cross-linking agent capable of reacting with a hydroxyl group.

4. The anti-reflection film according to claim 3, wherein the cross-linking agent is a compound that has two or more carbon atoms, each of which is substituted with an alkoxy group and adjacent to a nitrogen atom, per molecule.

5. A polarizing plate, which comprises:
a polarizing film; and
at least two protective films,
wherein an anti-reflection film according to claim 1 is used as one of the at least two protective films.

6. An image display device in which an anti-reflection film according to claim 1 is used in the outermost surface of the display.

7. An image display device in which a polarizing plate according to claim 5 is used in the outermost surface of the display.

8. The anti-reflection film according to claim 1, wherein $L^{21}$ represents a divalent linking group which is formed by a combination of —COO— and an alkylene group.

* * * * *